US010993380B2

(12) United States Patent
Stoneham et al.

(10) Patent No.: US 10,993,380 B2
(45) Date of Patent: May 4, 2021

(54) APPARATUS, SYSTEMS, AND METHODS FOR LATERALLY SOURCED LIGHTING

(71) Applicant: Edward Stoneham, Los Altos, CA (US)

(72) Inventors: Edward B. Stoneham, Los Altos, CA (US); Chiamin Cheng, Saratoga, CA (US)

(73) Assignee: XtremeLUX Corporation, Campbell, CA (US)

( * ) Notice: Subject to any disclaimer, the term of this patent is extended or adjusted under 35 U.S.C. 154(b) by 212 days.

(21) Appl. No.: 16/315,647

(22) PCT Filed: Jul. 4, 2017

(86) PCT No.: PCT/US2017/040640
§ 371 (c)(1),
(2) Date: Jan. 6, 2019

(87) PCT Pub. No.: WO2018/009494
PCT Pub. Date: Jan. 11, 2018

(65) Prior Publication Data
US 2019/0216021 A1 Jul. 18, 2019

Related U.S. Application Data

(60) Provisional application No. 62/358,274, filed on Jul. 5, 2016.

(51) Int. Cl.
*A01G 7/04* (2006.01)
*F21V 7/00* (2006.01)
(Continued)

(52) U.S. Cl.
CPC ............... *A01G 7/045* (2013.01); *A01G 9/00* (2013.01); *A01G 9/023* (2013.01); *F21V 7/0008* (2013.01);
(Continued)

(58) Field of Classification Search
CPC .......... A01G 7/045; A01G 9/00; A01G 9/023; F21V 7/005; F21V 7/0008; F21V 29/56
See application file for complete search history.

(56) References Cited

U.S. PATENT DOCUMENTS 4,299,054 A * 11/1981 Ware ...................... A01G 31/02
47/64
4,419,843 A * 12/1983 Johnson, Sr. .......... A01G 9/023
47/82

(Continued)

*Primary Examiner* — Monica L Barlow
*Assistant Examiner* — Aaron M Rodziwicz

(57) ABSTRACT

A light projector assembly for irradiating the interior of a bin when the bin is in a predetermined position, the bin having walls and a ceiling. A bin interior may include a plant-growing zone proximate a bottom of the bin. The walls may include one or more light-transmissive windows above the plant-growing zone. The light projector assembly may comprise a light projector and a support structure. A light projector may be supported outside of the bin position and proximate to and spaced from one of the one or more windows when the bin assembly is in the predetermined position. The light projector may be configured to project light upwardly through the one window and toward the ceiling. A support structure may support the light projector. The support structure may be spaced from a vertical extension of the predetermined position, unobstructive of vertical access to the bin.

33 Claims, 18 Drawing Sheets

(51) Int. Cl.
*A01G 9/00* (2018.01)
*F21V 29/56* (2015.01)
*A01G 9/02* (2018.01)

(52) U.S. Cl.
CPC .............. *F21V 29/56* (2015.01); *F21V 7/005* (2013.01); *Y02P 60/14* (2015.11)

(56) References Cited

U.S. PATENT DOCUMENTS

| | | | | |
|---|---|---|---|---|
| 4,612,726 | A * | 9/1986 | Mori | ........................ A01G 9/00 47/66.1 |
| 8,905,590 | B2 * | 12/2014 | Stoneham | ............. F21V 7/0025 362/294 |
| 10,426,144 | B2 * | 10/2019 | Capodice | ................. A01G 9/02 |
| 2012/0099300 | A1 * | 4/2012 | Napoli | .................... F21S 8/033 362/147 |
| 2013/0135872 | A1 * | 5/2013 | Stoneham | ............. F21V 7/0091 362/294 |

* cited by examiner

TOP VIEW

SIDE VIEW

END VIEW

TOP VIEW

SIDE VIEW

END VIEW

TOP VIEW

SIDE VIEW

TOP VIEW

SIDE VIEW

TOP VIEW

SIDE VIEW

TOP VIEW

SIDE VIEW

APPARATUS, SYSTEMS, AND METHODS FOR LATERALLY SOURCED LIGHTING

RELATED APPLICATIONS

This application claims the benefit of U.S. Provisional Application No. 62/358,274, filed Jul. 5, 2016, which application is incorporated herein by reference in its entirety for all purposes.

BACKGROUND

The economics connected with the growth or tending of plants or other organisms in enclosed controlled environments depends in part on the amount of space that must be utilized per unit of produce, the efficiency with which energy-intensive requisites such as light and climate control can be applied, and the amount of labor required to tend to the developing produce. Existing practice includes the growth of plants in planters situated on floors, tables, or shelves. Light sources are positioned above the plants and are either spaced uniformly or configured with optics to provide uniform light deposition over the plants. In some cases the planters may be placed on pallets. The planters or pallets are placed, removed, accessed, or transported manually by humans, mechanically by forklifts, or automatically by robots. The light sources are usually stationary, and any access to or movement of the pallets or planters must avoid contact or collision with the light sources. Open space is required to allow access by humans, fork lifts, or robots and to allow pallets or trays to be pulled completely out from under the light sources for transport.

SUMMARY

A light projector assembly, a bin assembly, a method of irradiating plants growing in bins, and an irradiation system employing such elements for growing plants are described.

In an example, a light projector assembly is designed for irradiating a bin interior of a bin assembly when the bin assembly is positioned in a bin position, the bin assembly having a plurality of walls extending around the bin interior and bounded on the top by a ceiling. The bin interior may include a plant-growing zone proximate a bottom of the bin assembly. The plurality of walls may include a window assembly of one or more light-transmissive windows distributed around the plurality of walls above the plant-growing zone with at least a first wall of the plurality of walls including a first window of the one or more windows. The light projector assembly may comprise a light projector and a support structure. In an example, a light projector may be configured to be supported outside of the bin position and proximate to and spaced at least a first predetermined distance from the first window when the bin assembly is in the bin position, the light projector configured to project light upwardly through at least a first irradiation portal corresponding to the first window of the bin in the bin position and toward the ceiling when the bin assembly is in the bin position. A support structure may be supporting the light projector, the support structure being spaced from a vertical extension of the bin position.

In an embodiment, a bin assembly is designed for supporting plants during growth, the bin assembly comprising a first bin and a ceiling. A first bin may have a bottom for supporting the growing plants and a plurality of walls extending upwardly from the bottom, the walls and bottom defining a bin interior including a plant-growing zone in a lower portion of the bin interior proximate the bottom, the plurality of walls including a window assembly of one or more windows distributed around the plurality of walls above the plant-growing zone. A ceiling may be configured to be supported over the bin interior, the ceiling having a light-reflective lower surface facing the bin interior, the window assembly being configured to expose at least a portion of the ceiling lower surface from externally of the bin.

In an example, a method is devised for irradiating plants growing in bins comprising: positioning a bin having a plurality of walls and a bottom defining a bin interior including a plant-growing zone proximate to the bin bottom, the plant-growing zone containing a plant growing medium, with a first bin wall facing a first light projector; supporting a ceiling over the bin; and directing light from the first light projector through a window of the first bin wall, the window being above the plant-growing zone.

In an embodiment, an irradiation system for growing plants includes a bin, a ceiling, a light projector, and a support structure.

DETAILED DESCRIPTION OF VARIOUS EMBODIMENTS

Figure 1A:
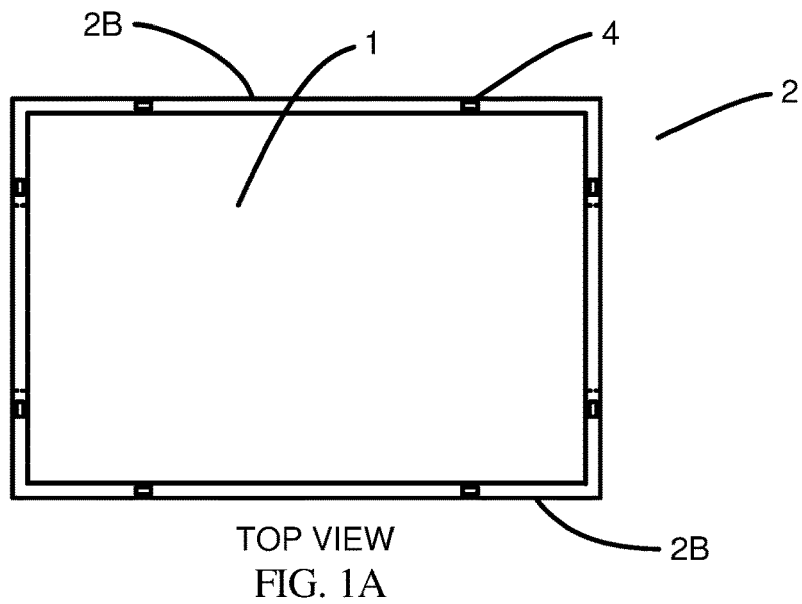
FIG. 1A is a top view of an example of a bin showing some features that may be included in a bin.

The disclosed apparatus, systems, and methods for laterally sourced lighting will become better understood through review of the following detailed description in conjunction with the drawings. The detailed description and drawings provide examples of the various embodiments described herein. Those skilled in the art will understand that the disclosed examples may be varied, modified, and altered without departing from the scope of the disclosed structures. Many variations are contemplated for different applications and design considerations; however, for the sake of brevity, not every contemplated variation is individually described in the following detailed description.

The costs of the space and labor required for the growth or tending of plants or other organisms can be mitigated if some practices developed for warehousing are adopted. Such practices include the standardization of transportable units such as pallets, containers, or bins; the employment of shelving or stacking to allow placement of transportable units on multiple levels in the vertical dimension; and the employment of robots, and/or other automatic or semi-automatic mechanisms for handling the transportable units with reduced labor. The schemes chosen impose limits on the ways in which lighting and climate control may be applied.

One space- and labor-saving scheme involves the stacking of bins on top of each other and the use of robots, cranes, or other automatable mechanical devices for accessing and transporting the bins by lifting one or more bins vertically to a level above other bins and moving them horizontally to a new destination. In this case, any fixturing, such as light sources, reflectors, and climate control hardware, which should for practical reasons remain fixed in position, which fixturing is preferably fixed in position and placed outside of vertical paths of the bins to allow the bins to be freely transported vertically past the fixturing. Placement of light sources above or at the top of each bin, as would normally be desired to achieve uniform irradiation of the contents of the bin, may not be feasible in this case, and other solutions may be preferable.

In the so-called vertical farming industry a common practice is to place horizontal planters on shelves and to place an array of light bars—long, narrow sources of light—directly above the planters. This arrangement can result in good uniformity (typically plus or minus ten percent) of light irradiation over the planter with little loss (typically twenty percent or less) of light to areas other than the planters. If one wishes to grow plants in vertically stacked bins, on the other hand, one would be tempted to place light bars in the top of each bin. The light bars would have to be movable, either moving out of the way to allow the bins to be accessed vertically or remaining attached to the bins and moving with them. Either method introduces complications involving mechanical mechanisms that raise costs and introduce reliability problems and/or require the making and breaking of electrical connections to the light sources, which would also raise costs and introduce reliability problems.

A solution is desired in which the light sources can remain fixed outside the paths of vertical motion of the bins but are nevertheless able to provide, with acceptably little loss of light, at least an adequate degree, and preferably at least a good degree, of uniformity of irradiation of the bin contents. An adequate degree of uniformity would be two-to-one variation of photon fluence rate over ninety percent of the exposed area of the bin's contents. A good degree of uniformity would be plus or minus ten percent variation of photon fluence rate over ninety percent of the exposed area of the bin's contents. Acceptably little loss of light would be defined as a condition in which at least half of the light photons emitted by the light sources contribute to the fluence of photons incident on the exposed area of the bin's contents. The solution should preferably cause little or no interference with climate control measures such as cooling and/or air flow.

An embodiment of apparatus, systems, and methods for laterally sourced lighting designed to provide acceptably uniform irradiation of contents within vertically accessible bins is described in more detail with reference to FIGS. 1-18. In the various figures, like or similar features may have the same reference labels. Each figure may include one or more views of objects.

Figure 1B:
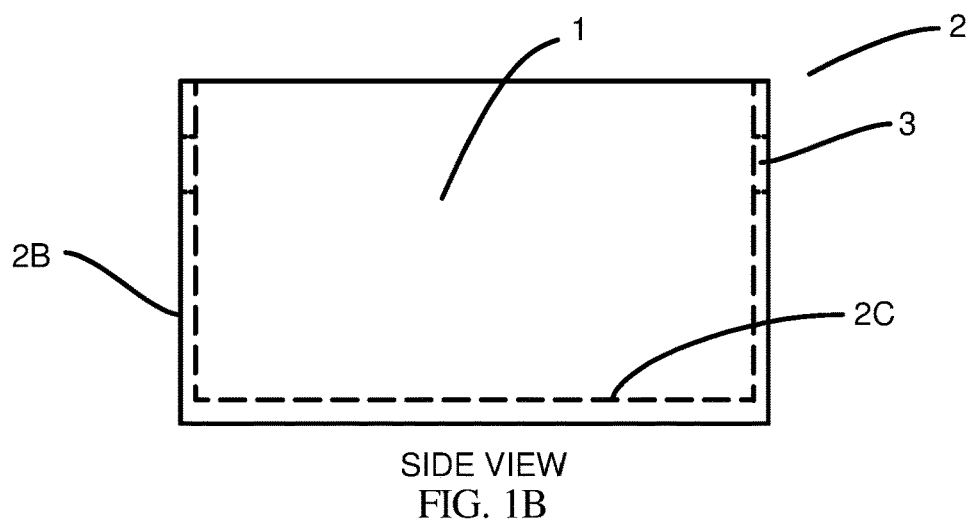
FIG. 1B is a side view of the bin shown in FIG. 1A.
Figure 1C:
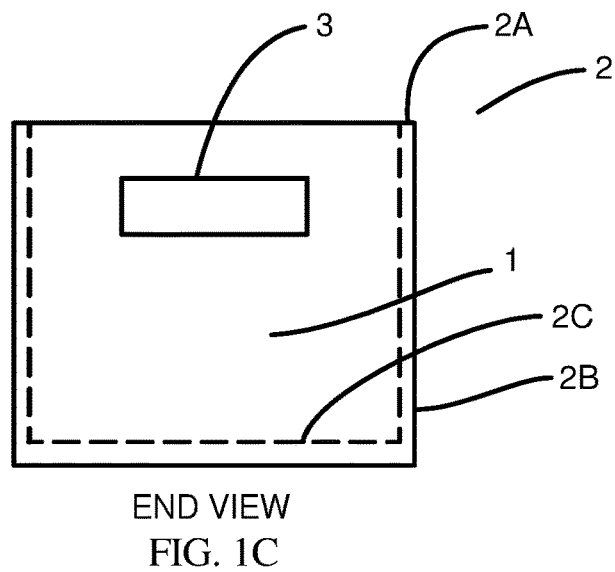
FIG. 1C is an end view of the bin shown in FIG. 1A.

FIGS. 1A, 1B, and 1C illustrate in a top view, a side view, and an end view respectively an example of a bin 2 showing various features that a bin 2 may have. Bin 2 may take the form of a container in the general shape of a rectangular parallelepiped and may be of any size ranging from microscopic size to the size of a building or larger. Bin 2 may have a plurality of walls 2B extending upward from a bottom 2C, the walls and bottom defining a bin interior 1. A wall 2B may have a top 2A defined as its farthest extent from the bottom 2C. The walls 2B and bottom 2C may have thicknesses consistent with the requirement of a degree of strength traded off against the need to accommodate a large volume within bin 2 while keeping the weight and material cost of bin 2 low. The walls 2B and bottom 2C may be partially hollow and may incorporate ribs, webs, or other strengthening structures. Handholds 3 may be provided, frequently in the form of holes or windows in two or more of the walls 2B of bin 2, to facilitate handling of bin 2 by humans. Also, to facilitate lifting and transportation of bin 2 by automatic or semi-automatic equipment such as robots, cranes, and hoists, bin 2 may feature one or more pick points 4. The pick points 4 may be features such as, but not limited to, holes, hooks, or cavities that can be engaged by equipment to allow lifting of bin 2 and any contents 8 (see FIG. 3) that might be placed within bin interior 1. The example of a bin 2 depicted in FIG. 1A has eight pick points 4. The number of pick points 4 must be traded off against the sizes of pick points 4 required to bear the weight of bin 2 and its contents 8. With fewer pick points 4 the sizes of pick points 4 may have to be increased to bear the same weight. Increasing the sizes of pick points 4 may reduce the amount of space available for contents 8 of a bin 2 having fixed outer dimensions.

Figure 2:
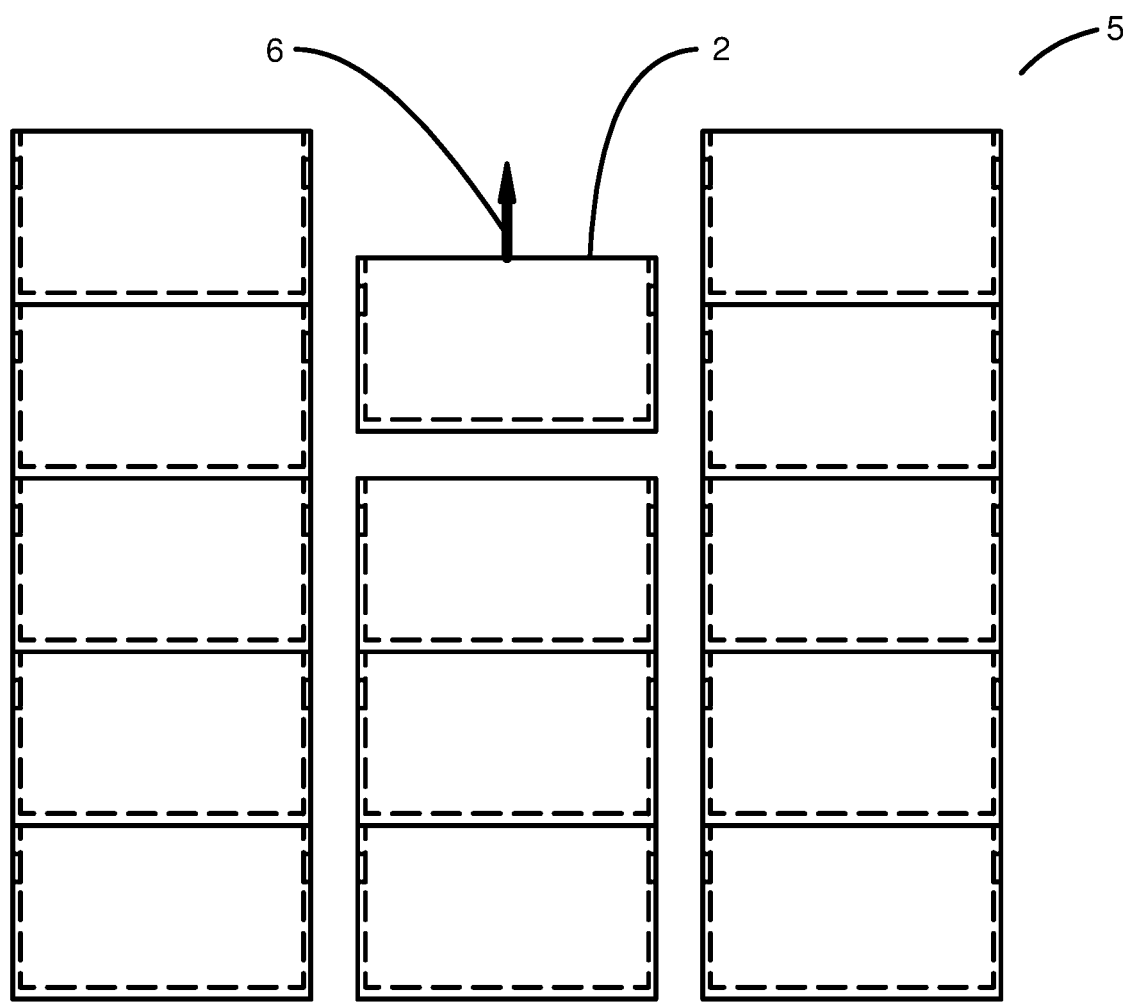
FIG. 2 is a drawing in one view depicting how, as an example, bins may be stacked and accessed.

A rectangular parallelepiped shape for bin 2 may facilitate close packing of one or more bins 2 side-by-side and end-to-end, and the flat top and bottom may facilitate the stacking of bins 2 one on another with little waste of space. Variations in shape from this ideal may be used as appropriate for ease of manufacturing, use, or other purposes. FIG. 2 shows a side view of an array 5 of three columns of bins 2, with bins 2 stacked one on another. Access to lower bins 2 requires that upper bins 2 be lifted or removed. In schemes that make efficient use of space a bin 2 may be moved vertically as shown by arrow 6 until it reaches a height above the surrounding bins 2, and then it can be transported to a position atop another column of bins 2 or to one side of the array 5. For such motions to occur, it is helpful that there be no obstructions in the vertical paths of bins 2.

Figure 3A:
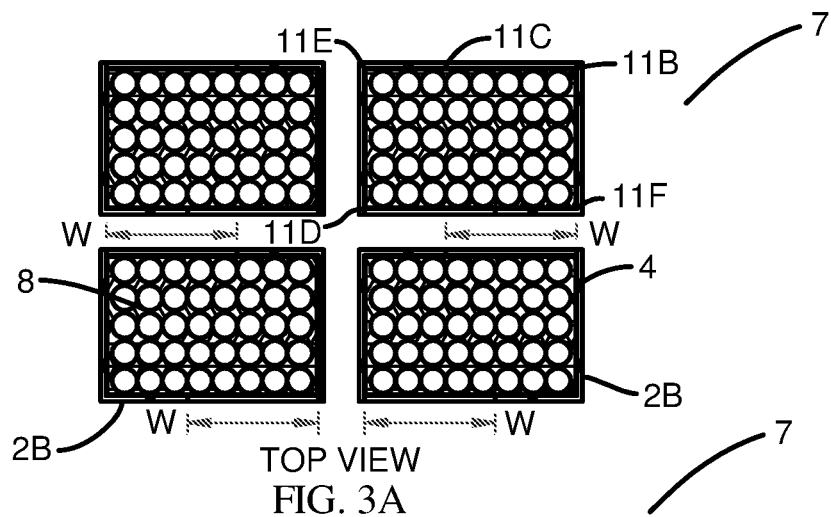
FIG. 3A is a top view of an example of a three-dimensional array of bins with contents in the bin interiors and windows in the walls of the bins.
Figure 3B:
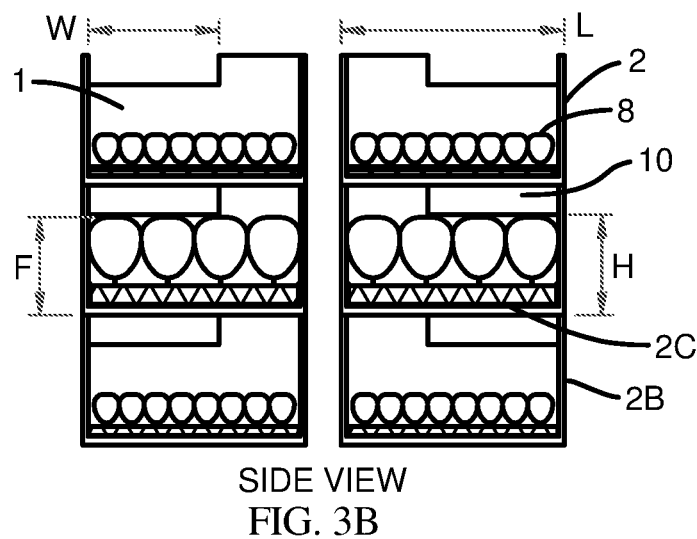
FIG. 3B is a side view of the bin array shown in FIG. 3A.
Figure 3C:
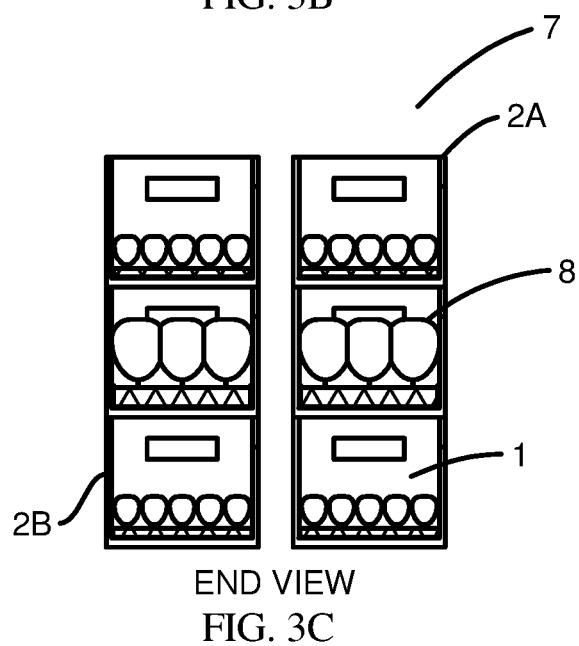
FIG. 3C is an end view of the bin array shown in FIG. 3A.

FIGS. 3A, 3B, and 3C illustrate in a top view, a side view, and an end view respectively an example of a three-dimensional array 7 of bins 2. While the three-dimensional array 7 shown has three bins 2 stacked up in each of two stacks in each of two rows, it should be understood that a three-dimensional array 7 may consist of any number of stacks in any number of rows and that each stack may include any number of bins 2. Within the bin interior 1 of each bin 2 may reside contents 8 such as plants. In FIG. 3B and FIG. 3C a wall 2B has been removed from each of the bins 2 to reveal the contents 8. The contents 8 of a bin 2 may vary in height F above the bottom 2C of the bin 2.

The apparatus described herein may enable uniform light irradiation of the contents 8 within bins 2 while the bins 2 are stacked in arrays 7. If the bins 2 are transparent to the light, the light can be supplied through the walls 2B of the bins from sources of light outside the bins 2. In this case, a significant fraction (typically ten percent) of the light will be reflected by the walls 2B and will not directly enter the bins 2. In addition, light that enters the bins 2 may re-exit the bins 2 before being absorbed by the contents 8. To avoid these losses of light it is preferred that the walls 2B of bins 2 be opaque and highly reflective on their inner surfaces.

If the walls 2B of bins 2 are opaque, light may be admitted through windows such as the windows 10 shown in FIG. 3B. The base of each window may be located at a height H above the bottom 2C of a bin 2. If height H is equal to or greater than the greatest height F of the contents 8 within bin 2, the windows 10 may remain unobstructed by the contents 8. Each window 10 may have a width W less than or equal to the length L of a bin 2. A window 10 may take the form of a cutout in a wall 2B of a bin 2, in which case light may pass through unobstructed. Alternatively, a window 10 may take the form of a transparent portion of a wall 2B of a bin 2 or may take the form of a sheet of transparent material such as glass or plastic or a screen. If window 10 serves a second purpose of allowing air to flow into and out of a bin 2, then a cutout or screen may be preferred relative to a solid transparent portion or material.

A wall 2B may have one window 10, as depicted in FIG. 3A and FIG. 3B as an example, or a wall 2B may alternatively have more than one window 10 or an assembly of windows 10.

In one embodiment each window 10 may, as shown by example in FIGS. 3A, 3B, and 3C, take the form of a cutout extending from a right-rear corner 11B of a bin 2 to a position 11C located a width W away from right-rear corner 11B, with width W roughly between one-fourth and three-fourths of length L. Each bin 2 may, in this embodiment, have two such windows 10, the second of which may extend from a left-front corner 11D of a bin 2, which corner is diagonally opposite right-rear corner 11B of the same bin 2. Each window 10 may extend from height H above the bottom of the bin 2 to a level near or at the top 2A (see also FIG. 1C) of a wall 2B of the bin 2. With this window arrangement, left-rear corner 11E and right-front corner 11F of each bin 2 may remain intact with two walls 2B buttressing one another at each said corner. In addition, the windows 10 may impair a relatively small number of pick points 4, and the remaining pick points 4 may be distributed with rotational symmetry over the top 2A of each bin 2. As a result, the strength of each bin 2, its ability to bear the weight of other bins 2 stacked on top of it, and its ability to carry a heavy payload of contents 8 may be maintained with little or no required increase in thickness of the walls 2B. In addition, the existence of two windows 10 positioned near opposite extremes of bin 2 may facilitate air flow into and out of bin 2.

Figure 4A:
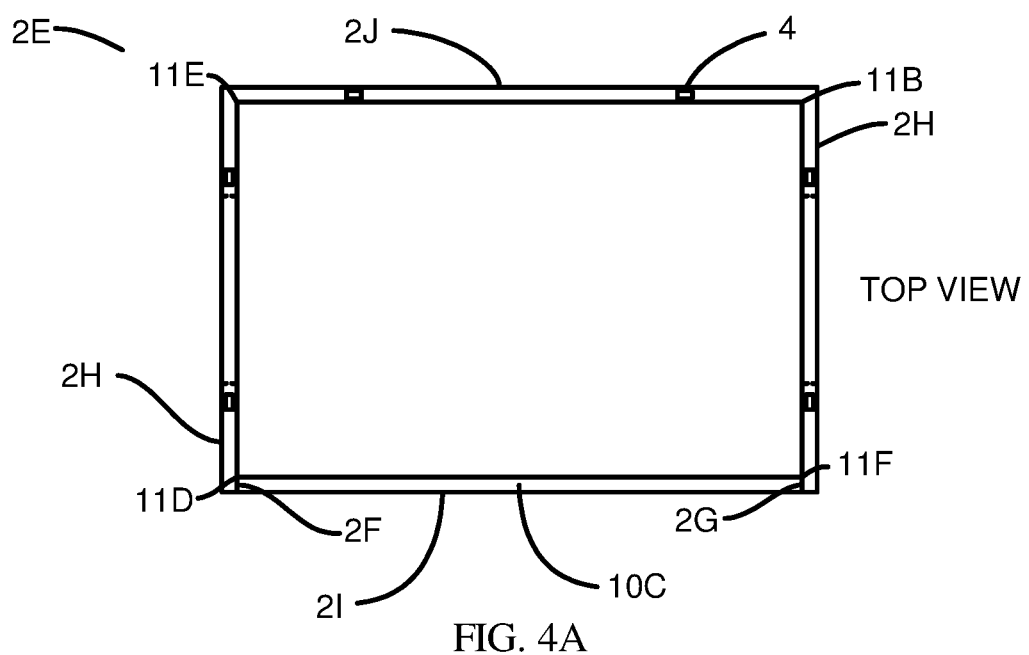
FIG. 4A is a top view of an example of a bin with a broad window in the front wall.
Figure 4B:
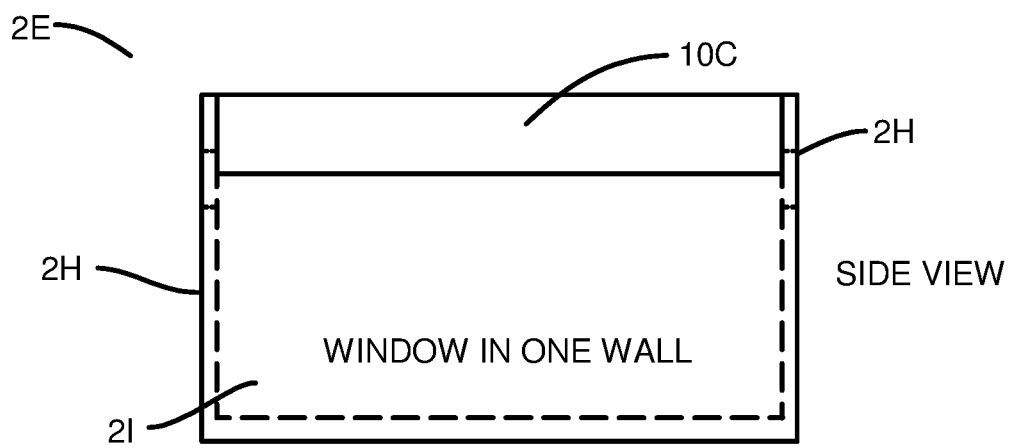
FIG. 4B is a side view of the bin shown in FIG. 4A.
Figure 4C:
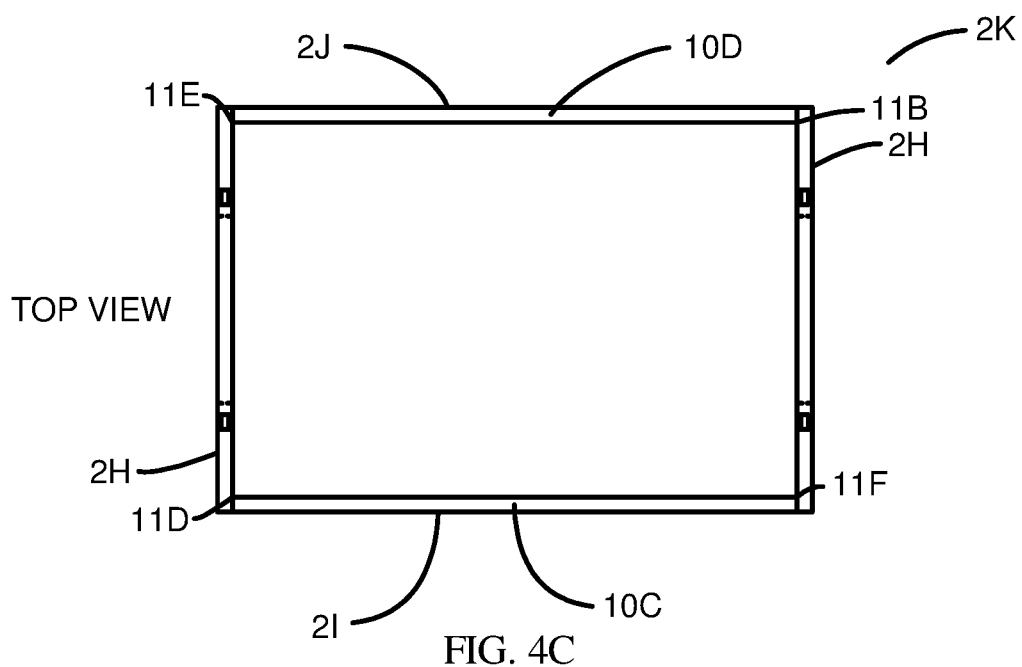
FIG. 4C is a top view of an example of a bin with a broad window in the front wall and a broad window in the back wall.
Figure 4D:
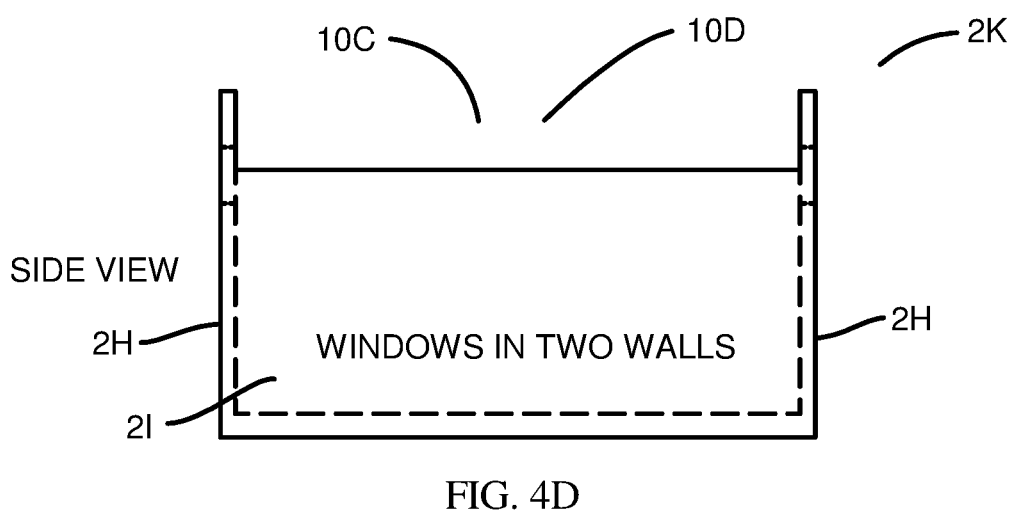
FIG. 4D is a side view of the bin shown in FIG. 4C.

At some sacrifice to the strength, weight-bearing capability, and payload capacity of each bin 2, window configurations other than that shown in FIGS. 3A, 3B, and 3C may be considered, and some of the remaining innovations described herein may still be applied. FIG. 4A and FIG. 4B illustrate, for example, in a top view and a side view respectively a single-broad-window bin 2E, and FIG. 4C and FIG. 4D illustrate, for example, in a top view and a side view respectively a double-broad-window bin 2K. Both may be considered as embodiments of a bin 2 described previously. Single-broad-window bin 2E and double-broad-window bin 2K each have a front wall 21 and a rear wall 2J and two end walls 2H, all of which may be considered as examples of wall 2B previously described with reference to FIGS. 1A, 1B, and 1C. Single-broad-window 2E and double-broad-window bin 2K, as shown in FIGS. 4A, 4B, 4C, and 4D, both have a front broad window 10C in front wall 21. Double-broad-window bin 2K, unlike single-broad-window bin 2E, has additionally a rear broad window 10D in its rear wall 2J. Front broad windows 10C and rear broad window 10D may be considered as particular examples of the general window 10 described in reference to FIG. 3A and FIG. 3B. In single-broad-window bin 2E the pick points 4 over front wall 21 may be missing, causing an unsymmetrical distribution of pick points, and portions 2F and 2G of two of the end walls 2H of single-broad-window bin 2E may not be buttressed at left-front corner 11D and right-front corner 11F. Also, in single-broad-window bin 2E, if the front broad window 10C is required for air exchange, air may have to flow both into and out of single-broad-window bin 2E through the one front broad window 10C, and the air circulation may thus be impeded. In double-broad-window bin 2K only the pick points 4 on two end walls 2H may remain, and portions of the end walls 2H at all four corners—left-front corner 11D, right-front corner 11F, left-rear corner 11E, and right-rear corner 11B—may be prone to bending or breakage unless strengthened by some additional structural elements that may increase cost or reduce space utilization. Air exchange, however, may be facilitated in double-broad-window bin 2K due to the presence of two broad windows, front broad window 10C and rear broad window 10D, in opposing walls, front wall 21 and rear wall 2J respectively.

Figure 5:
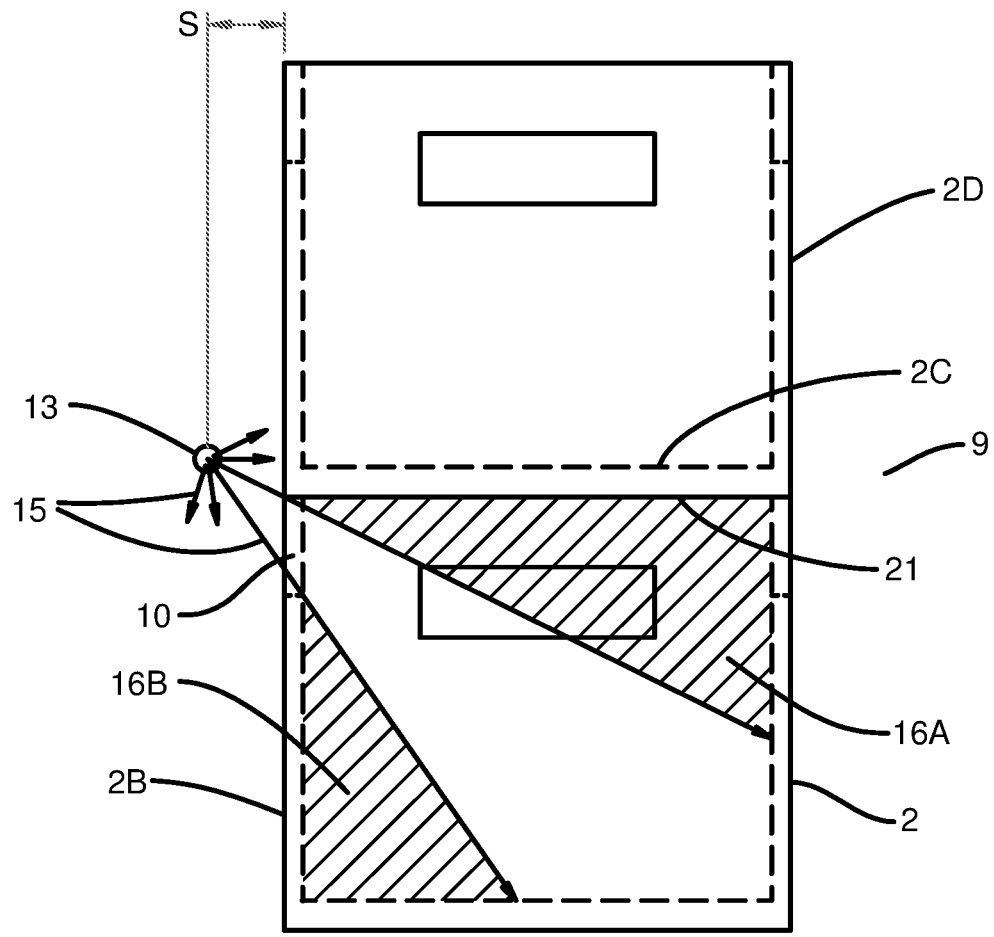
FIG. 5 is an illustration pointing out the difficulty of achieving uniform irradiation, within a bin assembly, directly from the light source.

Regardless of the window type, there may be a difficulty achieving direct irradiation, with acceptable uniformity, of the contents 8 within a bin with an external source of light. FIG. 5 illustrates the problem. Shown as an example is a bin assembly 9 comprising a bin 2 and a ceiling 21. The ceiling 21 in this example is presented by the bottom 2C of a second bin 2D stacked on top of bin 2. A light source 13 spaced a distance S from a wall 2B of a bin 2 sends light rays 15 in many directions. Some pass through window 10 of bin 2, which window 10 now acts as a portal of bin assembly 9. The second bin 2D, which may or may not be identical to bin 2, casts a shadow 16A in bin assembly 9, and the lower edge of window 10 casts another shadow 16B in bin assembly 9. Contents 8 of bin 2 that lie within shadow 16A or 16B receive no direct radiation, while other contents 8 receive full direct radiation.

Figure 6A:
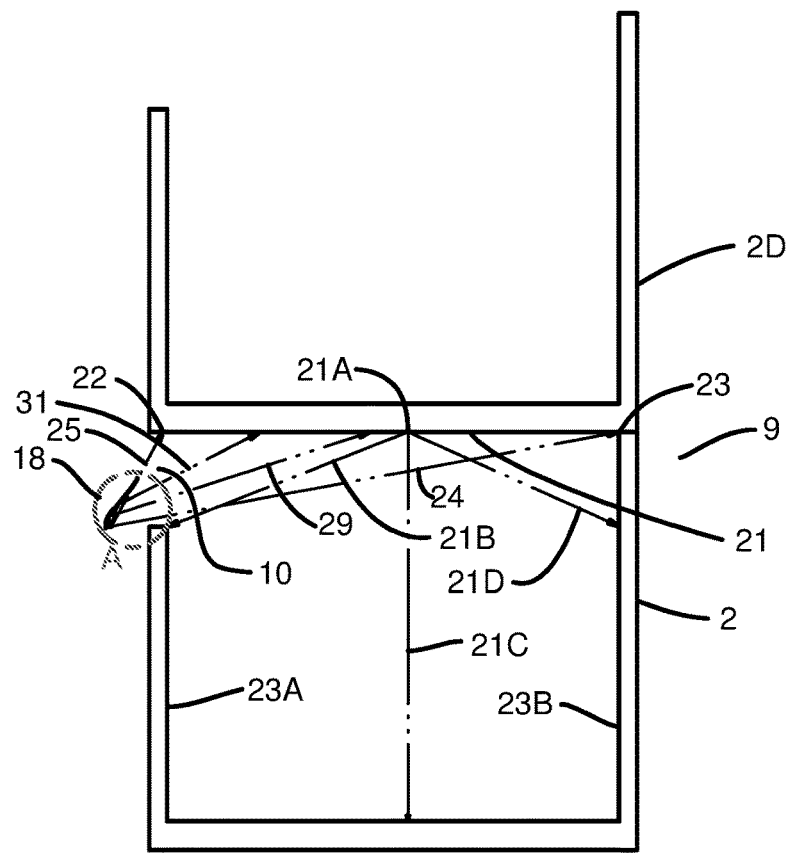
FIG. 6A shows in cross section an example of a light source, mirror surface, and bin assembly configuration capable of providing lighting of a bin interior and demonstrates various light paths.
Figure 6B:
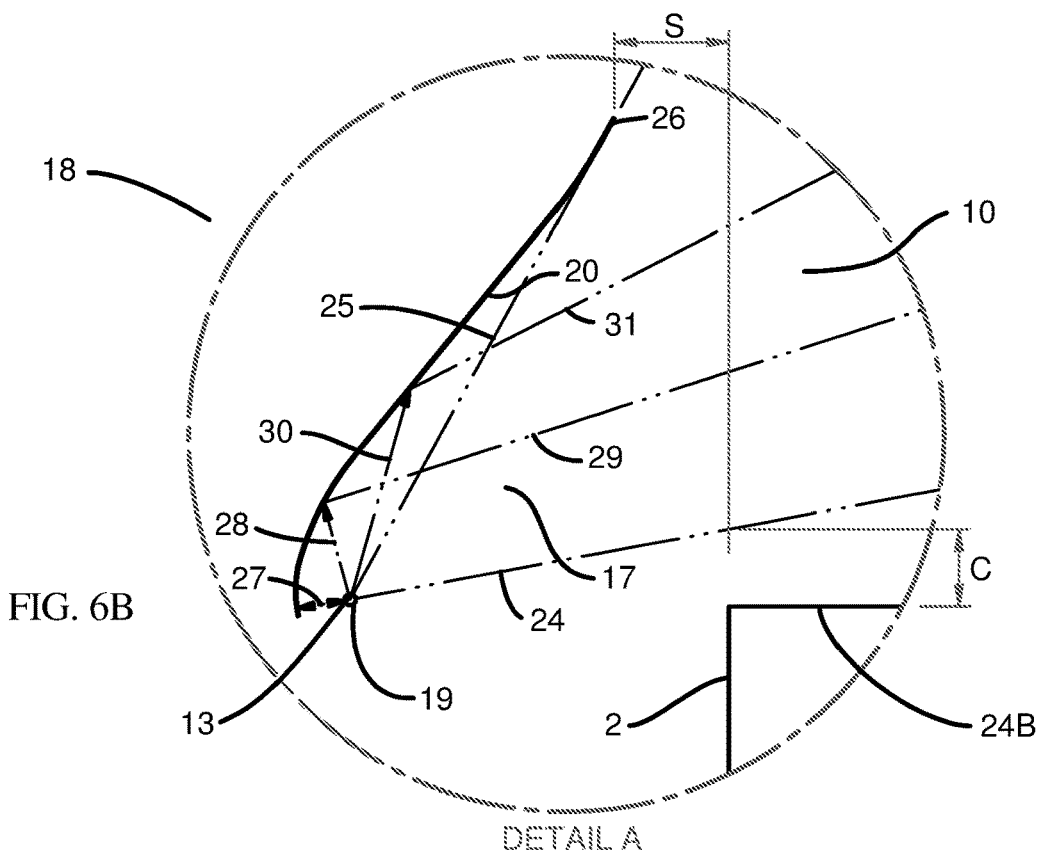
FIG. 6B shows in magnified detail a portion of FIG. 6A.

An example of apparatus that can avoid the above-described shadowing is shown in FIG. 6A, which depicts a cross section in a single plane of a bin 2, a window 10, a second bin 2D resting on top of bin 2, and a light projector 18 the details of which are shown in a magnified view labeled DETAIL A in FIG. 6B. Bin 2 and second bin 2D together form bin assembly 9 having a ceiling 21. Included in light projector 18 are a light source 13 and a mirror surface 20. To provide sufficient clearance for vertical motion of the bin 2 and the second bin 2D during transport and to facilitate the flow of air or other gas into and out of window 10, light projector 18 is spaced a distance S from a plane containing the nearest faces of bin 2 and second bin 2D.

An example of a suitable type of light projector 18 is described in U.S. Pat. No. 8,905,590, which patent is incorporated by reference herein for all purposes.

Light projector 18 may project light onto ceiling 21. The ceiling 21 may be substantially flat and highly reflective, and its reflectance may be highly diffusive. Alternatively, the ceiling 21 may be configured as a Fresnel reflector or Fresnel-lens-covered reflector designed to redirect light favorably. Portions of the ceiling 21 may be recessed in a way that may prevent ceiling 21 from contacting a surface on which second bin 2D may from time to time be placed. The recessed portions of the ceiling 21 may thus be spared the possibility of contamination or damage that may impair the reflecting properties of the ceiling 21.

The light projected onto the ceiling 21 at any position 21A may be reflected in many directions in the half-space below the ceiling 21. Rays 21B, 21C, and 21D may be examples of reflected light demonstrating how the entire contents 8 of bin 2 may be irradiated by the reflected light. If light projector 18 produces substantially uniform irradiation at all positions 21A on the ceiling 21 between nearby position 22 and the ceiling 21's farthest extent 23, then, as is a commonly-known trait of indirect lighting, the irradiation of the surface of any contents 8 at any level within bin 2 may be acceptably uniform, particularly if the inside surfaces, such as front inner surface 23A and rear inner surface 23B and other inner surfaces not shown, of bin 2 are highly reflective of light.

As shown in FIG. 3 the top bin 2 in a stack will have no bin 2 above it and, hence, may have no ceiling 21 at its top. In this case, a lid (not shown) may be placed over the bin 2 to constitute a bin assembly 9, with the bottom surface of the lid serving as the ceiling 21 on top of the bin 2.

Light projector 18 may be designed to project the light from light source 13 onto the ceiling 21 with some degree of uniformity. For example, a light projector 18 as described in U.S. Pat. No. 8,905,590 may be configured to distribute light with less than two-to-one variation over eighty percent of the area of the ceiling 21. Alternatively, a light projector 18 as described in U.S. Pat. No. 8,905,590 may be configured to distribute light over the ceiling 21 in a pattern that is less uniform but intended to produce better uniformity over the contents 8 of the bin 2.

Light source 13 may emit light from a narrow region 19 around a source line (not shown) perpendicular to the plane of the cross section of FIG. 6A and FIG. 6B. The narrow region 19 may have a radius shorter than the length of the shortest ray 27 between the source line and mirror surface 20. In addition, the light source may emit its light into a region of space 17 that is roughly a half-space. This region of space 17 may be bounded by the source plane containing the source line and a ray 24, in the plane of the cross section of FIG. 6A and FIG. 6B, that clears the bottom 24B of window 10 by a vertical clearance C, and that strikes the ceiling 21 at its farthest extent 23. Mirror surface 20 may be designed such that light from light source 13 that is emitted in the source plane in the general direction of ray 24 and light from light source 13 that is emitted in a direction, like that of ray 25, that just skims mirror surface 20 near a distal edge 26 and light emitted in directions in between these two directions irradiate the ceiling 21 directly. Other than a small fraction, typically less than five percent, of stray light, the remainder of the light emitted by light source 13 may strike mirror surface 20 and, except for a small fraction of this light, typically less than ten percent, that is either absorbed or adversely scattered, may reflect specularly toward the ceiling 21. For instance, the design of mirror surface 20 may be such that a ray 27 of light emitted in the source plane in a direction generally opposite that of ray 24 may reflect from mirror surface 20 toward the ceiling 21's farthest extent 23. In addition, a light ray such as ray 28 in FIG. 6B may reflect toward the ceiling 21 in a direction exemplified by ray 29, and a light ray such as ray 30 in FIG. 6B may reflect toward the ceiling 21 in a direction exemplified by ray 31. Through proper design of mirror surface 20 the light reflecting from the mirror surface 20 may be projected onto the ceiling 21 with virtually any desired distribution versus position. For example, if the irradiance on the ceiling 21 due to direct light from light source 13 is not uniform, mirror surface 20 may be designed to distribute the reflected light toward positions on the ceiling 21 at which the irradiance due to direct light irradiation is weakest, thereby improving the uniformity. In fact, within certain constraints on the radiation pattern of light source 13, the spacing S, the clearance C and the geometry of window 10 relative to the ceiling 21, mirror surface 20 may be designed such that the irradiance is nearly constant over the ceiling 21 from position 22 to position 23. With the ceiling 21 so uniformly irradiated, the indirect irradiation of the contents 8 of bin 2 may be acceptably uniform.

Figure 7A:
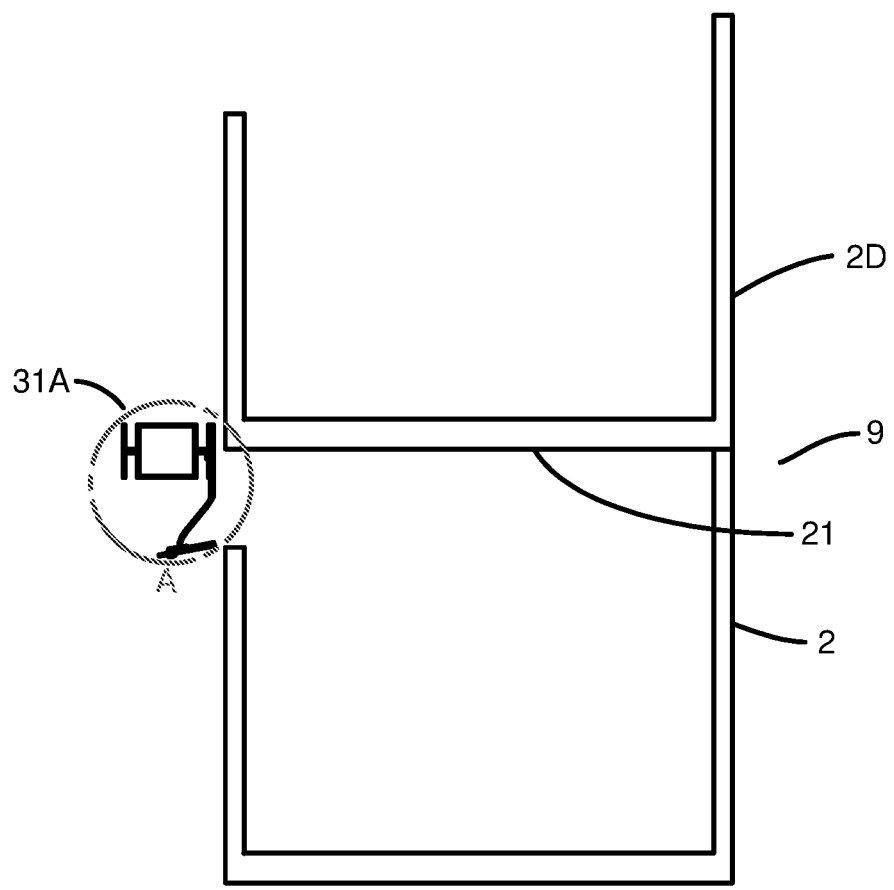
FIG. 7A shows in cross section an example of a practical implementation of the configuration shown in FIG. 6A and FIG. 6B, including features to assist in temperature control and to mitigate light loss.
Figure 7B:
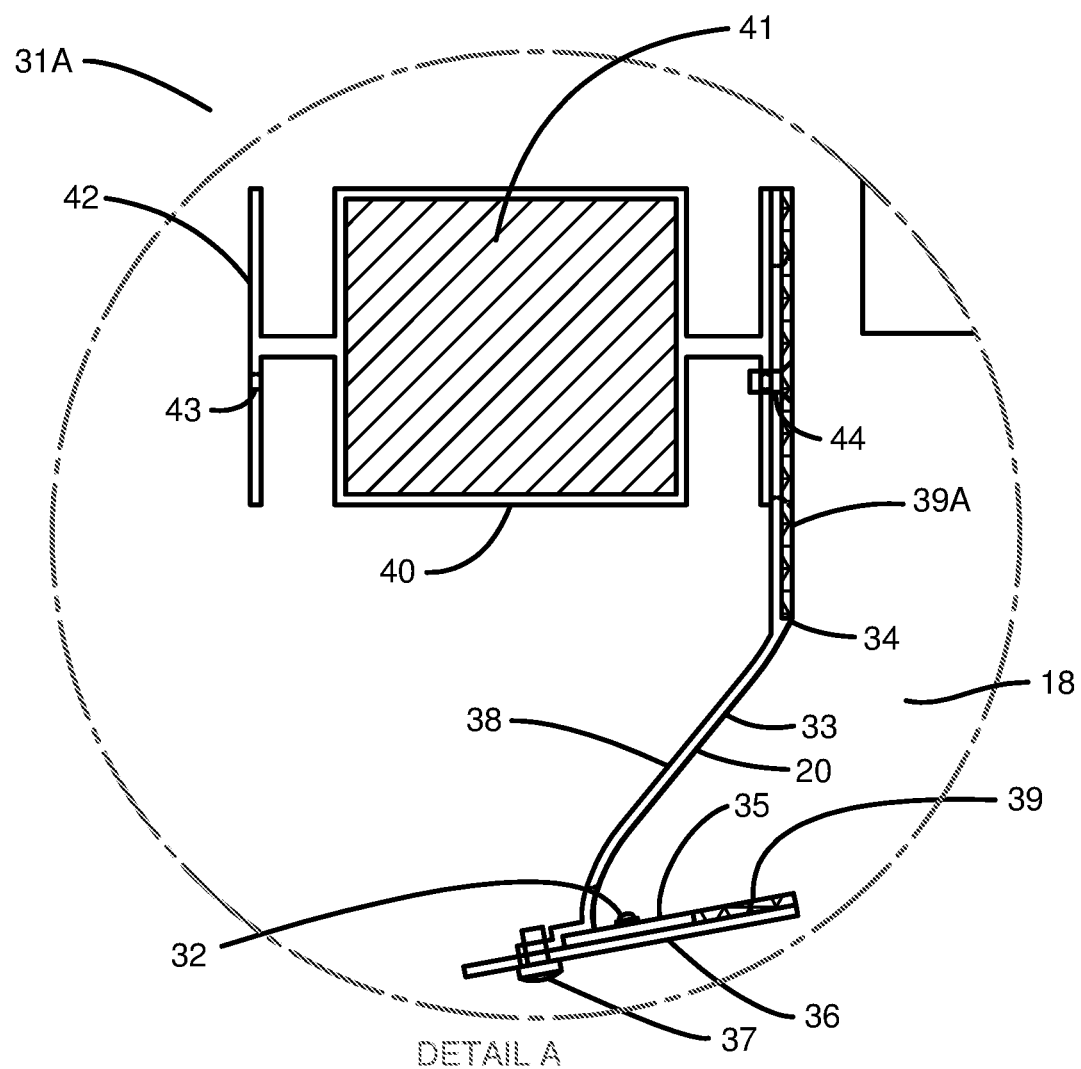
FIG. 7B shows in magnified detail a portion of FIG. 7A.

FIG. 7A and FIG. 7B illustrate a cross section of a practical embodiment of the configuration shown in FIG. 6A and FIG. 6B, including additional features to assist in temperature control and to mitigate light loss. A light projector assembly 31A, which includes a light projector 18, may be positioned outside bin assembly 9 comprising a bin 2 and a ceiling 21 provided by a second bin 2D as shown in FIG. 7A. Light projector 18, which is shown in detail in FIG. 7B, may include one or more light emitters 32 configured as required to function together as a light source 13 described previously in connection with FIG. 6B. The light emitters 32 may be light-emitting diodes, lasers, filaments, discharge tubes, or any other type of light source that may fit into the narrow region 19 shown in FIG. 6B in order to provide a sufficiently concentrated source of light. Light projector 18 may also include a mirror 33 having a mirror surface 20 designed, as previously described in reference to FIG. 6B, to achieve a desired distribution of irradiance across the ceiling 21. Mirror 33 may have an edge 34 distal to the light emitters 32. Light emitters 32 may be mounted to a circuit board 35, which in turn may be mounted to a heat spreader 36. Circuit board 35 and heat spreader 36 may, if desired, be one and the same. Circuit board 35 may be a high-thermal-conductivity metal-backed type that spreads heat from the light emitters 32, and heat spreader 36 may be composed of a high-thermal-conductivity material such as aluminum or copper. A thermal attachment fastener 37 may attach a mirror mount and thermal dissipator 38 to heat spreader 36. The thermal attachment fastener 37 may be a screw, a rivet, a weld joint, a clip, or other device that provides mechanical attachment and facilitates thermal conduction from the heat spreader 36 to the mirror mount and thermal dissipator 38. Alternatively, heat spreader 36 and mirror mount and thermal dissipator 38 may comprise a single unified piece of material, such as an extruded aluminum structure.

Mirror 33 may be attached to mirror mount 38. For example, mirror 33 may have a thin, flexible substrate, which may be composed of a material such as a polyester resin or other plastic, that may be attached to mirror mount 38 with an adhesive. As another example, mirror 33 may consist of a coating applied to mirror mount 38 and subsequently made highly reflective through deposition of one or more thin films onto the exposed coating surface. Alternatively, but not exclusively, mirror 33 may be integral with mirror mount 38, as, for example, would be the case if mirror mount 38 would have a polished surface acting as mirror surface 20.

Also attached to the heat spreader 36 next to circuit board 35 may be a retroreflective strip 39, and/or attached to mirror mount and thermal dissipator 38 may be a retroreflective sheet 39A. Retroreflective strip 39 and retroreflective sheet 39A may each consist of, for example, retroreflective sheeting with the property that most of the light incident on its broad exposed surface from a wide range of angles relative to the normal to the broad exposed surface is reflected back in the direction from which the light is incident. The retroreflective sheeting may be implemented, as is commonly known in the industry, with a front-surface corner-cube-reflector array, a back-surface prismatic array on a transparent substrate or film, an array of transparent spheres, or any other optical device capable of redirecting incident light into a direction substantially opposite the direction from which the light is incident. As an alternative, the retroreflective sheeting may be retroreflective in one dimension only, rather than in two dimensions. Such retroreflective sheeting may be implemented, as is also commonly known in the industry, with front-surface or rear-surface grooves each of which has two sides at right angles to each other, with arrays of transparent cylinders, or with other one-dimensionally retroreflective optics. With either two-dimensional or one-dimensional retroreflectors metalization, interference layers, or other films may be included to enhance the reflectivity of the reflecting surfaces. Antireflection layers may be included to reduce the reflectivities of surfaces that might otherwise detract from retroreflection.

In one embodiment retroreflective strip 39 and retroreflective sheet 39A may consist of a transparent substrate or film one to three millimeters thick with a specularly smooth front face, a prismatic back face, a highly-reflective metal coating, possibly including reflection-enhancing interference layers, on the prismatic surfaces, and, possibly, an antireflection layer on the front face.

Light projector assembly 31A may include all or a portion of a coolant channel 40 shown in cross section in FIG. 7B. Coolant channel 40 may be configured to contain a coolant 41 consisting of a liquid or gas that is allowed to flow. Coolant channel 40 may also include one or more attachment surfaces 42, each of which may include one or more holes 43 or other features to facilitate attachment of items to be cooled. Mirror mount and thermal dissipator 38 may be attached to an attachment surface 42 through the use of mounting fastener 44, which may be a screw, a rivet, a weld joint, a clip, or another device that provides mechanical attachment and/or facilitates a thermal conduction between the mirror mount and thermal dissipator 38 and the attachment surface 42. Mounting fastener 44, along with the configurations of mirror mount and thermal dissipator 38 and attachment surface 42, may be designed to allow vertical adjustment of light projector 18 relative to window 10. Coolant channel 40 may be long enough to accommodate a multiplicity of light projectors 18 and/or to address the full extent in one or more dimensions of a three-dimensional array 7 (see FIG. 3) of bins 2.

Figure 8A:
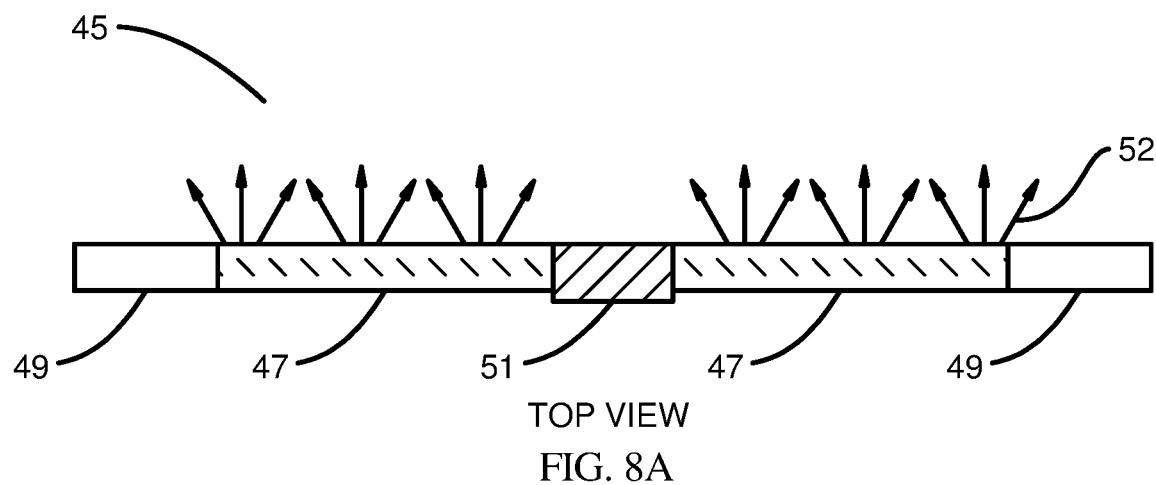
FIG. 8A depicts schematically a top view of an example of a light bar, showing typical broad outlines of components that may be included in the light bar.
Figure 8B:
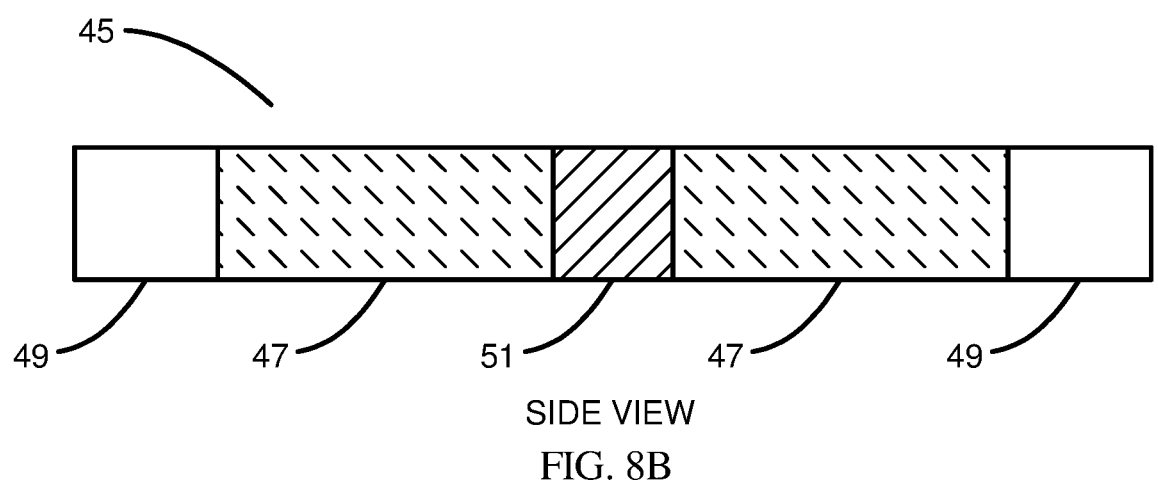
FIG. 8B depicts schematically a side view of the light bar featured in FIG. 8A.

FIG. 8A and FIG. 8B depict schematically and in broad outline form a top view and a side view respectively of a light bar 45.

Light bar 45 may include light-emitting sections 47. Light emitting sections 47 may have cross sections similar to the cross section of light projector 18 in FIG. 7B. Light-emitting sections 47 may be capable of emitting directed light 52 shown schematically in FIG. 8A.

Figure 9:
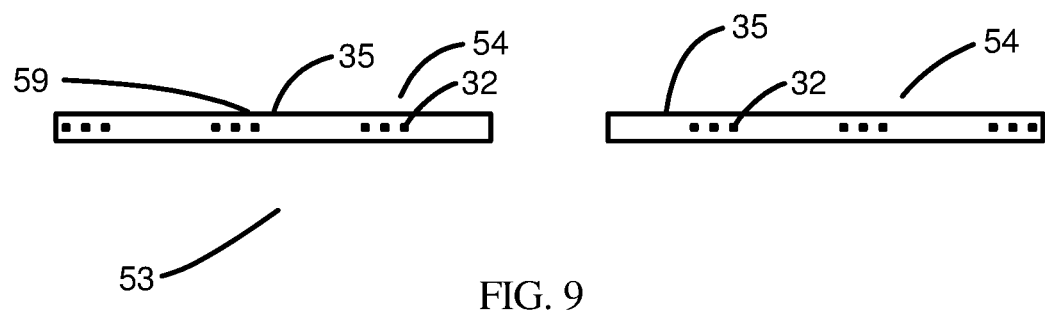
FIG. 9 shows, as an example, how light emitters might be arranged on circuit boards within a light bar.

In FIG. 9 is depicted, as an example, a plan view 53 of circuit board assemblies 54 that may be included in light-emitting sections 47 respectively of light bar 45. Circuit board assembly 54 may include a circuit board 35 (shown in cross section in FIG. 7B) and one or more light emitters 32 (shown also in FIG. 7B).

Figure 10:
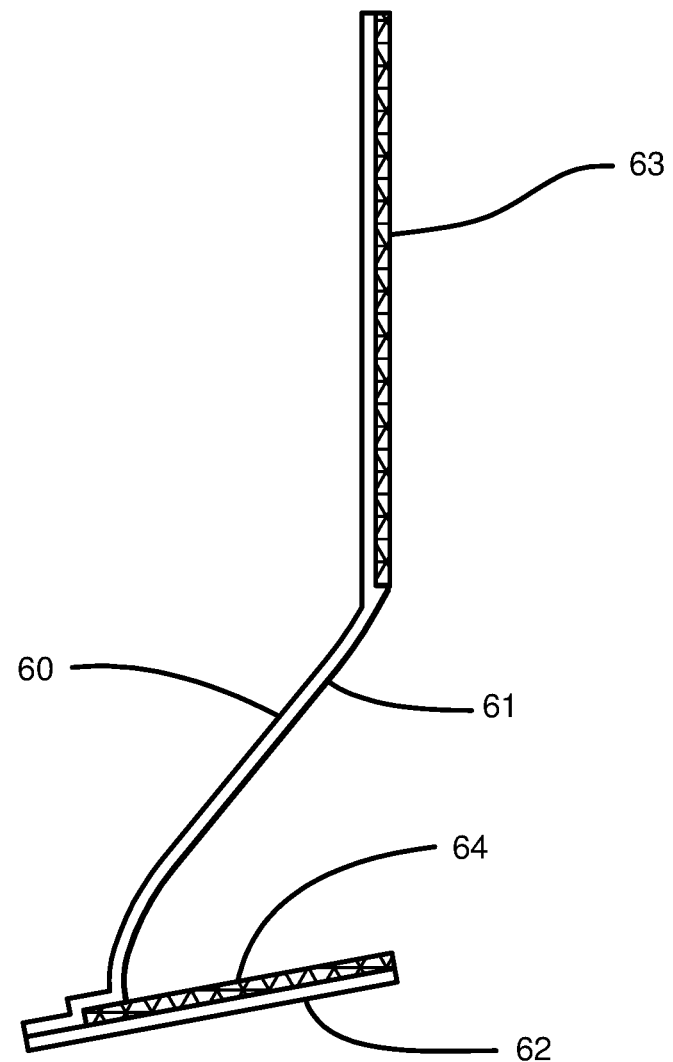
FIG. 10 shows in cross section an example of the geometry and content of a section of a light bar that acts as a reflector and heat sink only.

Light bar 45 in FIG. 8A and FIG. 8B may also include reflecting sections 49, each of which may have a cross section similar to that exemplified by reflecting section cross section 59 in FIG. 10. Reflecting sections 49 may each include a mirror mount and thermal dissipator 60, which may be similar to or a continuation of mirror mount and thermal dissipator 38 depicted in FIG. 7B; a mirror 61, which may be similar to or a continuation of mirror 33 depicted in FIG. 7B; a heat spreader 62, which may be similar to or a continuation of heat spreader 36 depicted in FIG. 7B; a retroreflective sheet 63, which may be similar to or a continuation of retroreflective sheet 39A depicted in FIG. 7B; and a retroreflective covering 64. Retroreflective covering 64 may cover most or all of the exposed upper surface of heat spreader 62 and may be otherwise similar to or a continuation of retroreflective strip 39 depicted in FIG. 7B.

Figure 11:
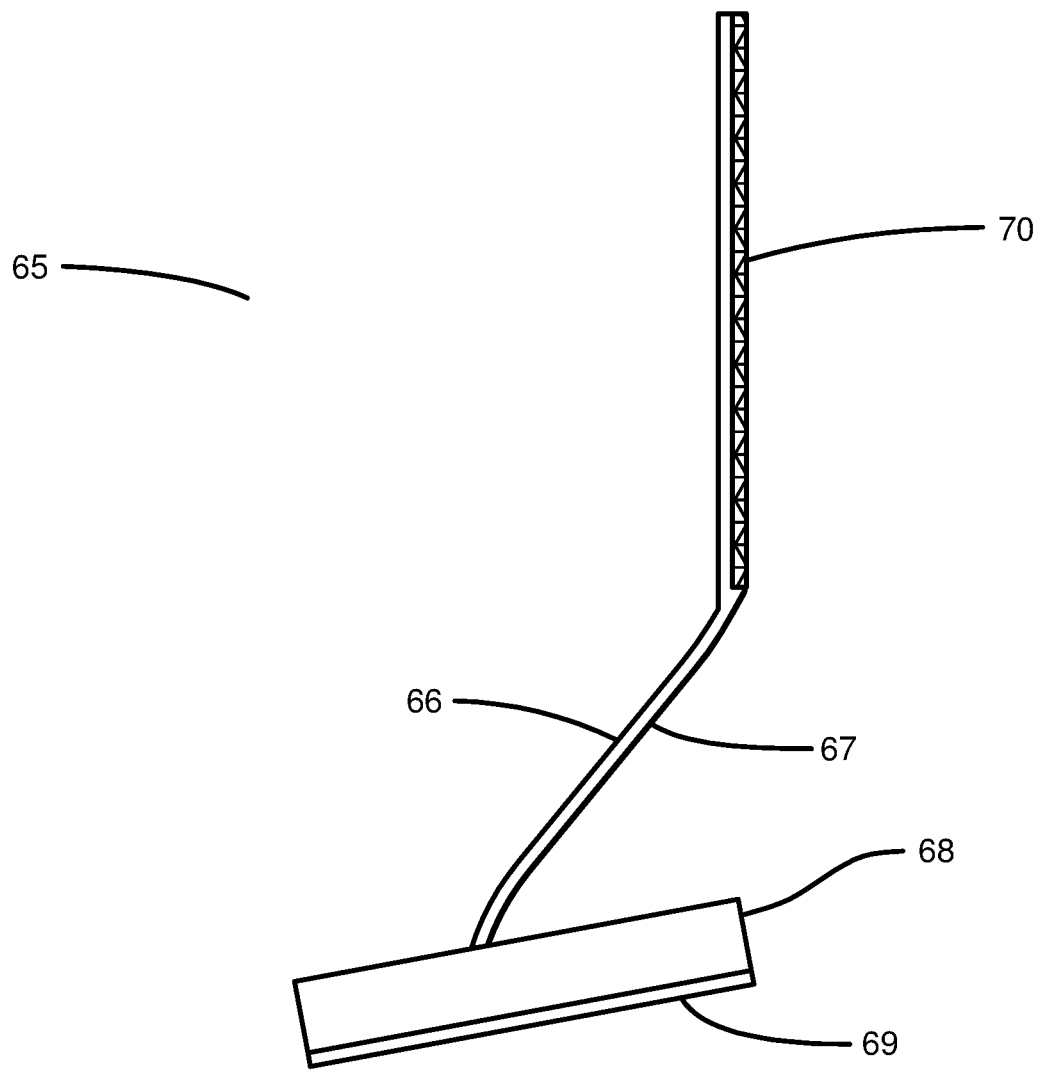
FIG. 11 shows in cross section an example of the geometry and content of a section of a light bar that contains the driver circuitry.

Light bar 45 depicted in FIG. 8A and FIG. 8B may also include a driver section 51, which may have a cross section similar to that exemplified by driver section cross section 65 in FIG. 11. Driver section 51 may include a mirror mount and thermal dissipator 66, which may be similar to or a continuation of mirror mount and thermal dissipator 38 depicted in FIG. 7B; a mirror 67, which may be similar to or a continuation of mirror 33 depicted in FIG. 7B; a driver assembly 68; a heat spreader 69, which may be similar to or a continuation of heat spreader 36 depicted in FIG. 7B; and a retroreflective sheet 70, which may be similar to or a continuation of retroreflective sheet 39A depicted in FIG. 7B. Driver assembly 68 may include electronic circuitry suitable for supplying controlled currents and voltages to the circuit board assemblies 54 (see FIG. 9) and/or to the light emitters 32 on one or more of those circuit board assemblies 54. Driver assembly 68 may also include electronic circuitry suitable for controlling the amount of power supplied to light emitters 32 and hence the amount of light emitted by light emitters 32.

Figure 12A:
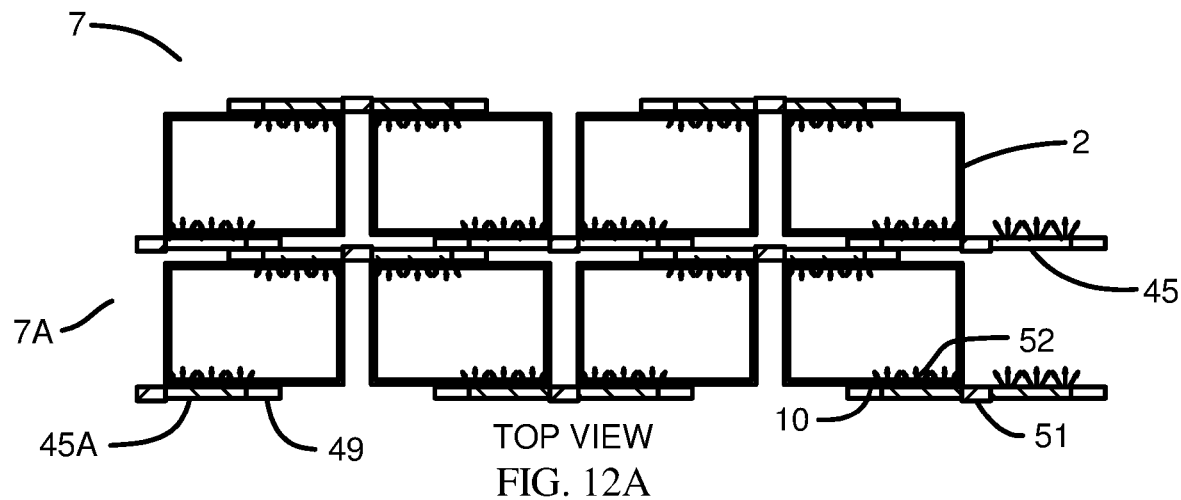
FIG. 12A is a top view of an example of an arrangement of light bars irradiating a three-dimensional array of bin assemblies.
Figure 12B:
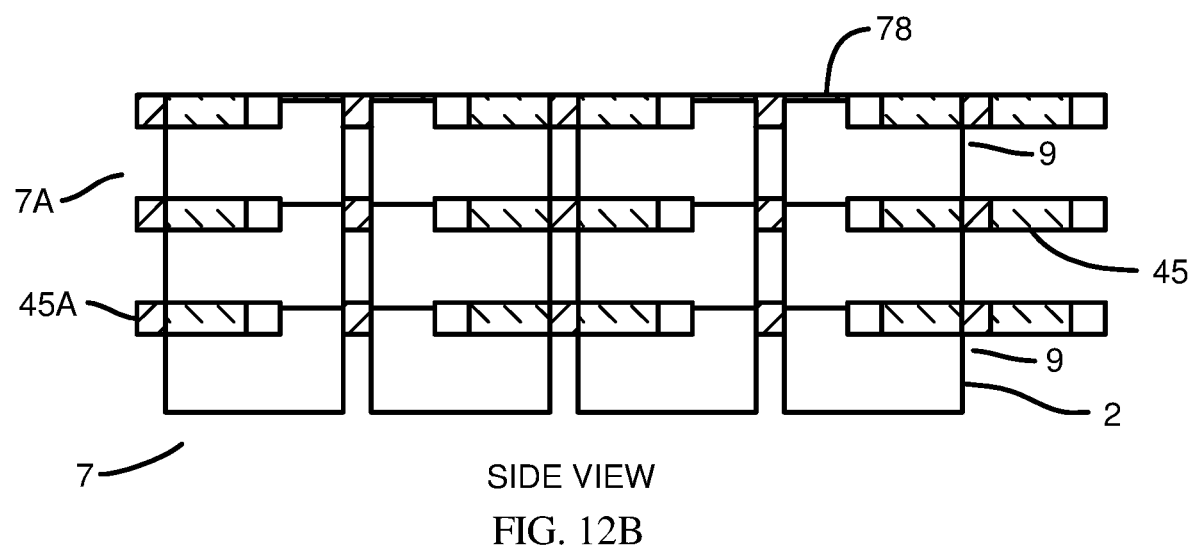
FIG. 12B is a side view of the items in FIG. 12A.

A configuration, shown as an example, in which light bars may be deployed to supply uniform lighting to multiple bins 2 is depicted in a top view in FIG. 12A and a side view in FIG. 12B. A three-dimensional array 7 of bins 2 may be accompanied by light bars 45, supplying directed light 52 through windows 10 acting as portals into bin assemblies 9. While the three-dimensional array 7 shown in FIG. 12A and FIG. 12B shows twice as many bins 2 as are shown in the three-dimensional array 7 of FIGS. 3A, 3B, and 3C, it should be understood that the three-dimensional array 7 of FIG. 12A and FIG. 12B, like that of FIGS. 3A, 3B, and 3C, may have any number of rows each containing any number of stacks each of which may include any number of bins 2. The light bars 45 shown in FIG. 12A and FIG. 12B may each be similar to the light bar 45 introduced in reference to FIG. 8 and may supply directed light 52.

Windows 10 of adjacent bins 2 may be offset horizontally in opposite sense, so that a single light bar 45 shorter than the combined lengths of two bins 2 may apply light to two adjacent bins 2 simultaneously. The driver section 51 of each light bar 45 may be conveniently situated, as shown, where no light emission is required in the space between adjacent bins 2. Half of the directed light 52 for each bin 2 may be supplied by one light bar 45 while the other half of the directed light 52 for that bin 2 may be supplied by another light bar 45 on the opposite side of that bin 2.

At an end 7A of the three-dimensional array 7 of bins 2, shortened light bars 45A may be substituted for the full-length light bars 45. Shortened light bar 45A may contain a single light-emitting section 47 and may include a driver section 51 and a single reflecting section 49 (see FIG. 8).

In the three-dimensional array 7 depicted in FIG. 12A and FIG. 12B adjacent bins 2 have their windows 10 offset in opposite senses. Consequently, two different bin types are required, and efforts must be made to ensure that bins of each type are correctly positioned in the three-dimensional array 7. These requirements can be considered disadvantageous, though they have the advantage of allowing the use of relatively short, inexpensive light bars 45.

Figure 13:
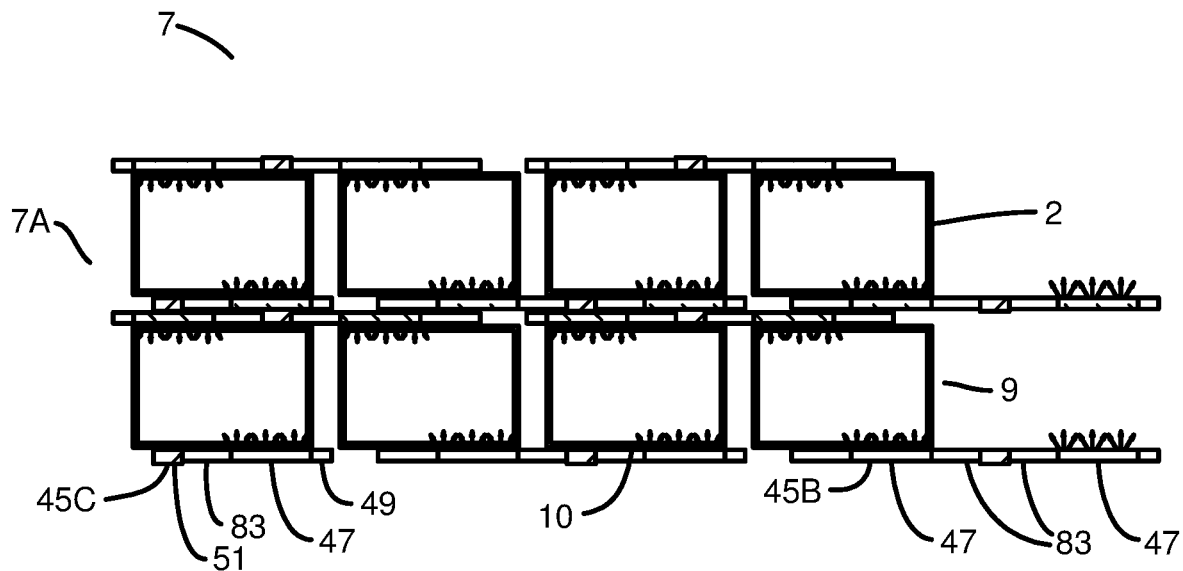
FIG. 13 is a top view of an example of an alternative arrangement of light bars and bin assemblies in which all bins are of the same design.

FIG. 13 illustrates, in a top view, a three-dimensional array 7 in which all bins 2 are of identical type, with the windows 10 located in the same sense on every bin 2. Stretched light bars 45B may resemble light bars 45 introduced in FIG. 8, but each stretched light bar 45B may include extra reflecting sections 83 added to provide increased separation of the light-emitting sections 47 as required to place the light-emitting sections 47 in front of the windows 10 of adjacent bins 2. At an end 7A of three-dimensional array 7 shortened stretched light bars 45C may be substituted for stretched light bars 45B. A shortened stretched light bar 45C may contain a single light-emitting section 47, may include a driver section 51, may include one or more reflecting sections 49 (see FIG. 8), and may include an extra reflecting section 83.

It may be noted, as shown in the examples of FIG. 12 and FIG. 13, that some light bars 45 or stretched light bars 45B may each project light into more than one window 10 and into more than one bin assembly 9. In some other embodiments a light bar 45 or stretched light bar 45B may project light into a plurality of windows 10 in a bin assembly 9.

Figure 14:
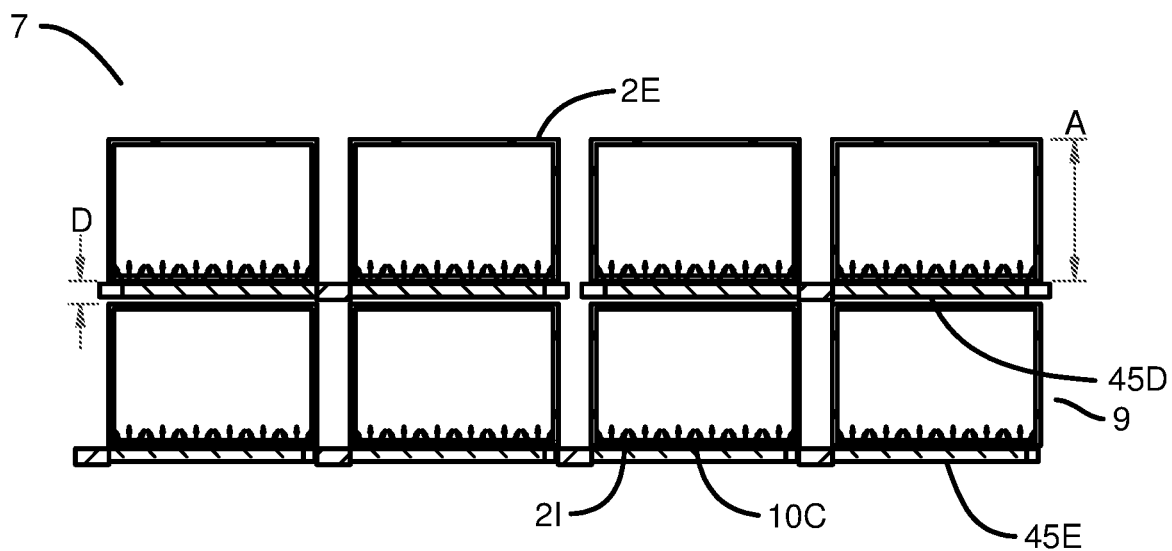
FIG. 14 is a top view of an example of another alternative arrangement of light bars and bin assemblies in which each bin assembly has a single broad window across one side.

In FIG. 14 is illustrated in a top view a three-dimensional array 7 of single-broad-window bins 2E of the same type as shown in FIG. 4A and FIG. 4B, having a front broad window 10C in front wall 21. The light for single-broad-window bins 2E may be supplied by light bars such as a two-bin light bar 45D, which is capable of servicing two single-broad-window bins 2E simultaneously, or a one-bin light bar 45E, which may service one single-broad-window bin 2E per light bar. This lighting configuration has an advantage in the fact that the width D of a light bar alley may be narrower than those of similar alleys in the configurations of FIG. 12 and FIG. 13, because there is just one slab of light bars within each alley in FIG. 14 as opposed to the two slabs required in the other configurations. On the other hand, the configuration of FIG. 14 may have the disadvantage discussed previously with regard to the strengths of the bins 2E in FIG. 4A and FIG. 4B.

Figure 15A:
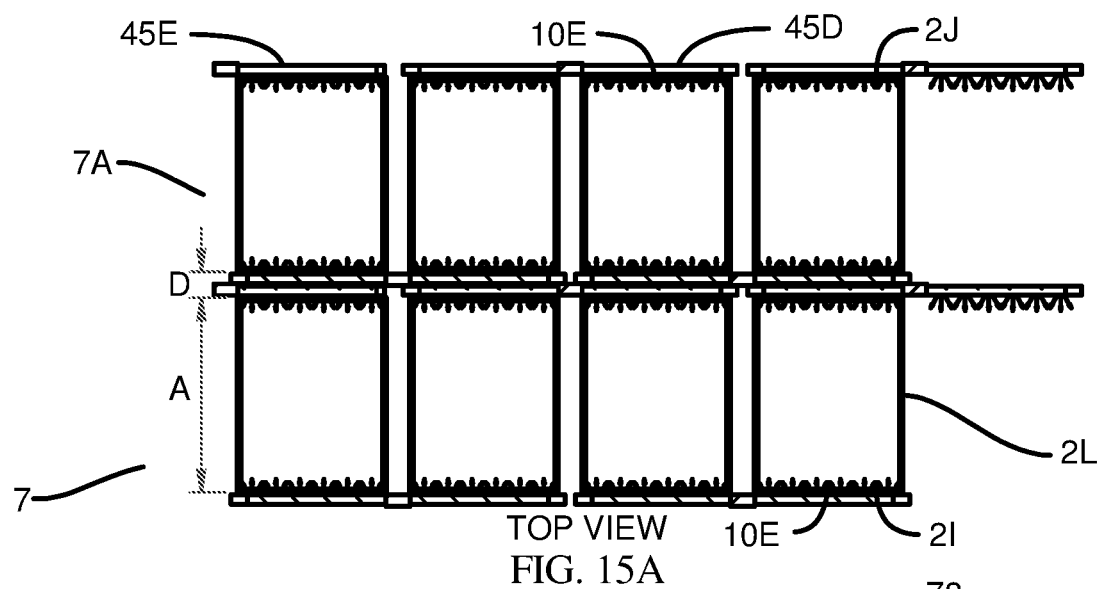
FIG. 15A is a top view of an example of an alternative arrangement of light bars and bin assemblies in which each bin assembly has a broad window across each of two opposite sides.
Figure 15B:
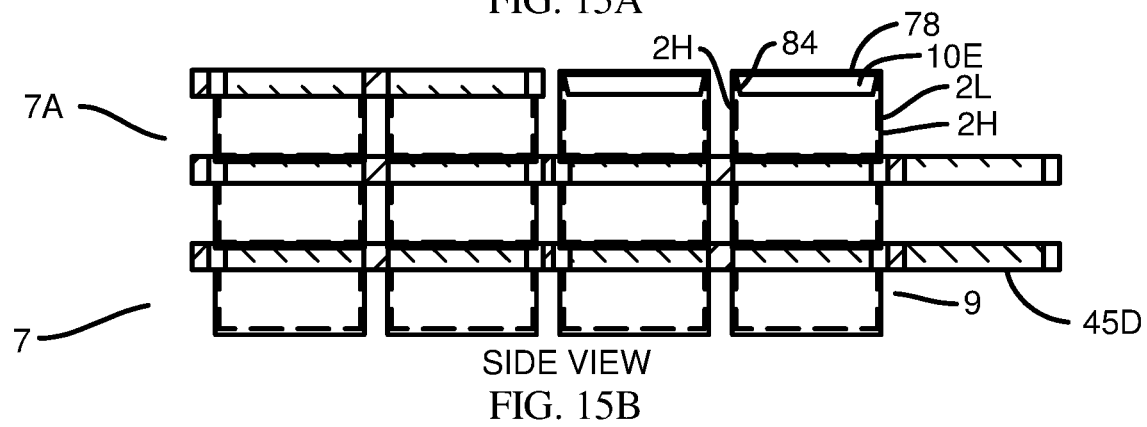
FIG. 15B is a side view of the items in FIG. 15A.

The fraction of space taken up by light bar alleys can be further reduced if the bins are enlarged to increase the space between light bar alleys. For example, single-broad-window bins 2E in FIG. 14 may be made twice as long in the alley-to-alley dimension A. Given a limited reach for achieving acceptable uniformity of light on a ceiling 21 (see FIG. 6A) by a light projector 18 through windows 10 of limited height, doubling the alley-to-alley dimension A may require projection of light from two directions as shown in FIG. 15A and FIG. 15B to achieve acceptable uniformity. A three-dimensional array 7 of extra-wide bins 2L is shown along with two-bin light bars 45D deployed to irradiate each of the extra-wide bins 2L from two directions. Each extra-wide bin 2L may include a front wall 21 and a rear wall 2J as introduced previously with reference to FIG. 4C and FIG. 4D. The front wall 21 and the rear wall 2J may each include a trapezoidally-shaped window 10E. In the side view of FIG. 15B the two-bin light bars 45D have been omitted near the top two extra-wide bins 2L on the right in order to reveal the trapezoidally-shaped windows 10E in the bin assemblies 9. As shown in FIG. 15B, trapezoidally-shaped windows 10E may be shaped to leave a sloped buttress 84 at each corner of each extra-wide bin 2L. The buttresses 84 may serve to strengthen end walls 2H. Lids 78 may be placed over the uppermost of the extra-wide bins 2L to provide the ceilings 21 (see FIG. 6A) that complete the bin assemblies 9 at the tops of the stacks. At an end 7A of three-dimensional array 7 one-bin light bars 45E may be substituted in place of two-bin light bars 45D. The light bar alley width D may be the same as the light bar alley width for the scheme shown in FIG. 13; however, the alley-to-alley dimension A is about twice as great, thereby reducing the percentage of the area taken up by light bar alleys.

Figure 16:
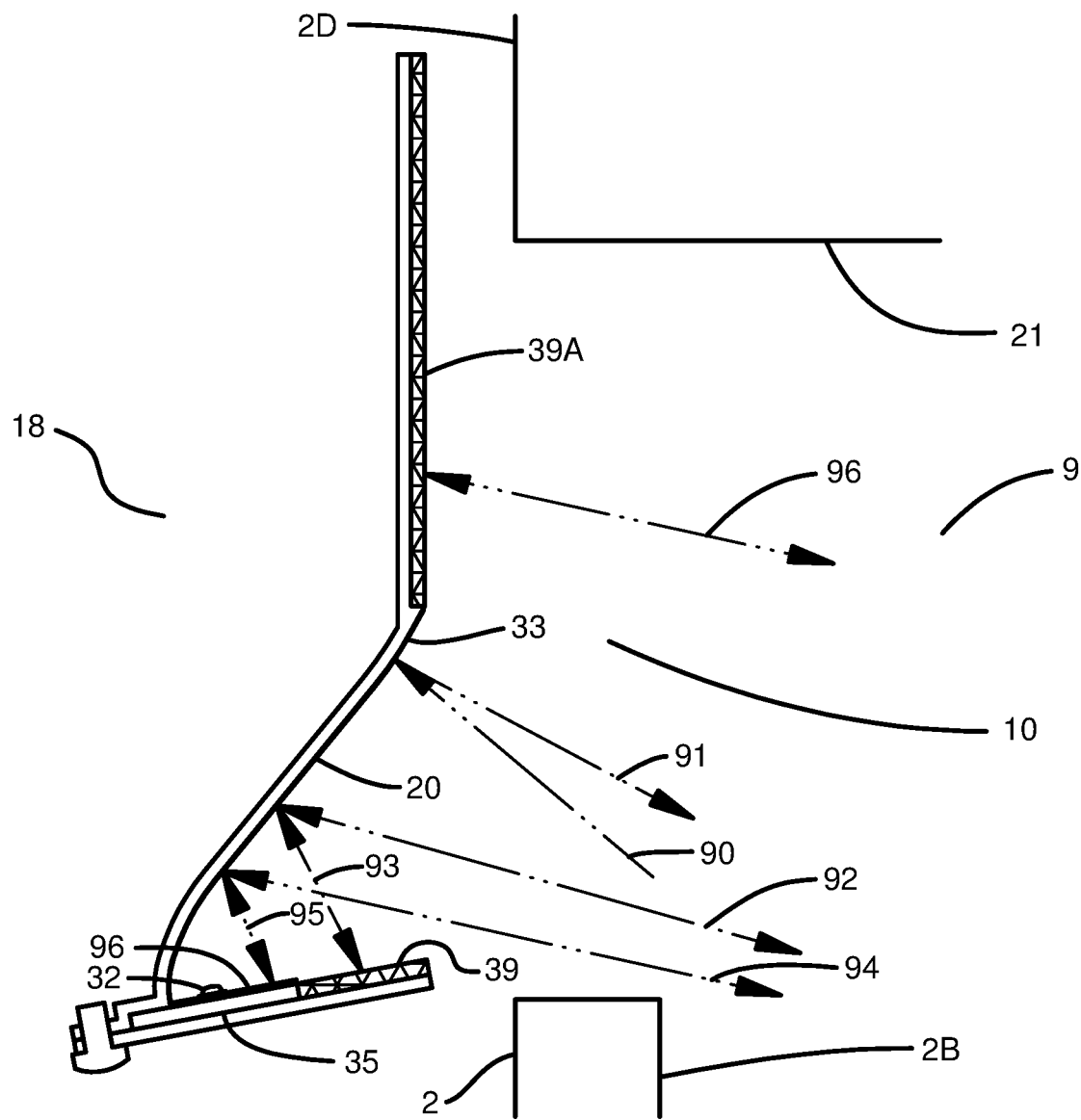
FIG. 16 shows in cross section an example of various stray light paths and the reflection of light back toward the source of the stray light, the reflection being aided by retroreflective sheeting including some that is located on the surfaces of the circuit boards.

Some of the light projected through a window 10 into a bin assembly 9 may re-emerge through the window 10. It is possible to return much or most of that light to the bin assembly 9. An example of a way in which emerging light can be returned to a bin assembly 9 is illustrated in FIG. 16. A light projector 18 next to a window 10 in a wall 2B of a bin 2 topped by a second bin 2D is shown in cross section.

Light projector 18 is designed to project light into bin assembly 9 through window 10. Window 10 not only allows light to enter bin assembly 9, but it also allows light to exit bin assembly 9. Some light exiting bin assembly 9, such as ray 90, may strike mirror surface 20 and reflect back, as illustrated by ray 91, through window 10 back into bin assembly 9. Other light, such as light approaching mirror surface 20 on path 92 may be reflected by mirror surface 20 along path 93 toward retroreflective strip 39. Retroreflective strip 39 may reflect such light back along path 93 toward mirror surface 20, which in turn may reflect the light back along path 92 through window 10 into bin assembly 9. Other light, such as light approaching mirror surface 20 on path 94 may be reflected by mirror surface 20 along path 95 toward printed circuit board 35. Printed circuit board 35 may be covered, except in the vicinity of a light emitter 32, with a retroreflective cover 96 that may reflect the light incident on path 95 back along path 95 to mirror surface 20, where the light may be reflected back into bin assembly 9 through window 10 along path 94. Other light such as light exiting bin assembly 9 along path 96, may strike retroreflective sheet 39A, which may reflect the light back along path 96 into bin assembly 9 through window 10. From these examples it can be seen that with judicious use of retroreflective sheeting with high fractional retroreflectance most of the light exiting bin assembly 9 through window 10 may be returned to bin assembly 9 thereby reducing light losses.

Alternatively, much of the light exiting window 10 may be reflected back into bin assembly 9 if retroreflective strip 39, retroreflective cover 96, and/or retroreflective sheet 39A is, rather than being made from retroreflective sheeting, made with a highly reflective material or coating the reflectance of which may be specular (like a mirror) or diffuse (like a flat white surface) or somewhere in between these extremes.

Figure 17:
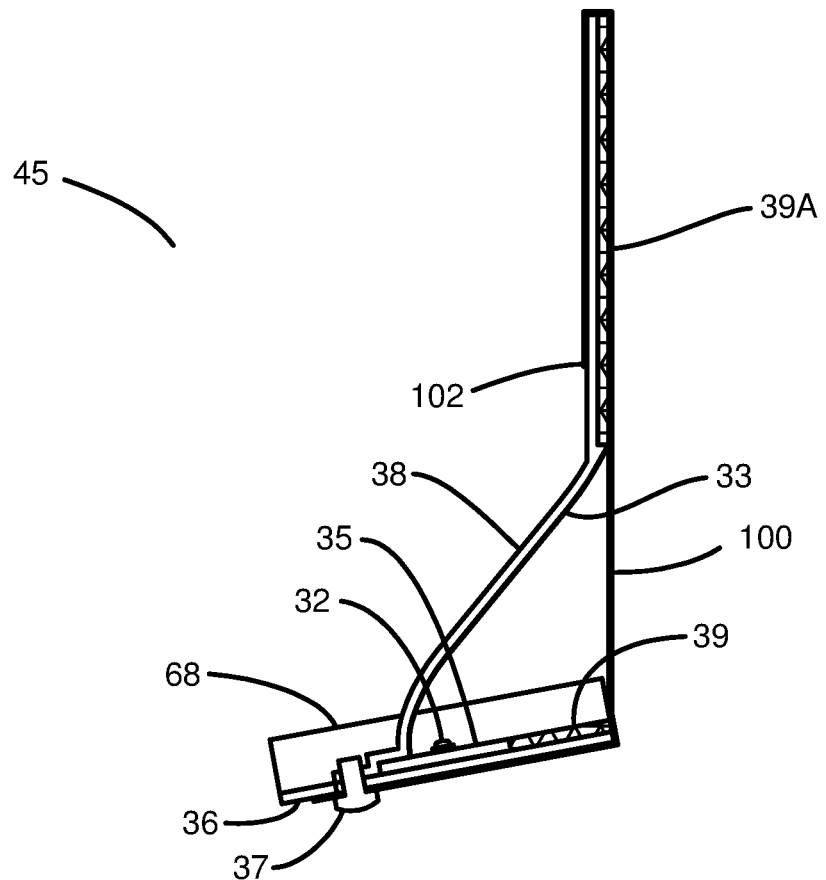
FIG. 17 shows in cross section an example of the use of transparent material to protect the light bar optics from dust and water and possibly to convert some of the light to light of different wavelengths.

A method for protecting the light emitters 32, PC boards 35, mirrors 33, a driver assembly 68, and/or retroreflective elements such as retroreflective strip 39 and retroreflective sheet 39A in a light bar 45 is depicted in cross section in FIG. 17. The light bar 45 may be wrapped or enclosed in a transparent material 100. Material 100 may have antireflection layers on one or both major surfaces and/or may have adhesive material on one major surface or a portion of one major surface. Material 100 may wrap around part or all of mirror mount and thermal dissipator 38 and/or around part or all of heat spreader 36 and may be secured in part with thermal attachment fastener 37. An edge 102 of material 100 may end on the back of mirror mount and thermal dissipator 38. Material 100 may fold over the ends (not shown) of light bar 45 to further enclose it. In this fashion the sensitive components of light bar 45 may be protected from dust, moisture, and/or mechanical damage.

Part or all of material 100 may contain fluorescent dye or phosphor material rendering material 100 capable of converting some of the light from emitters 32 to light of a different wavelength. Part of material 100 may be configured as a lens, a Fresnel lens, a lens array, and/or a light diffuser and/or deflector.

Figure 18A:
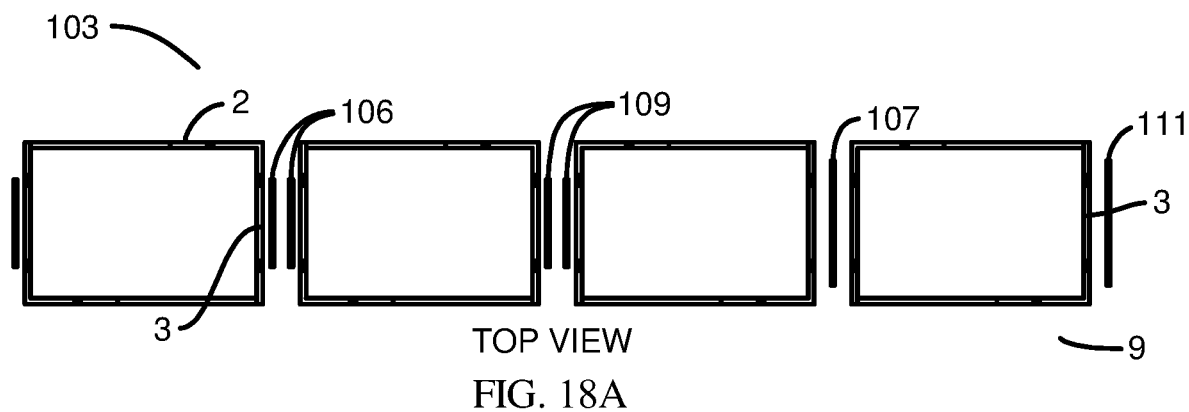
FIG. 18A is a top view of an example of an array of bin assemblies and various retroreflectors positioned to return to the bin assemblies light that escapes through handhold cutouts.
Figure 18B:
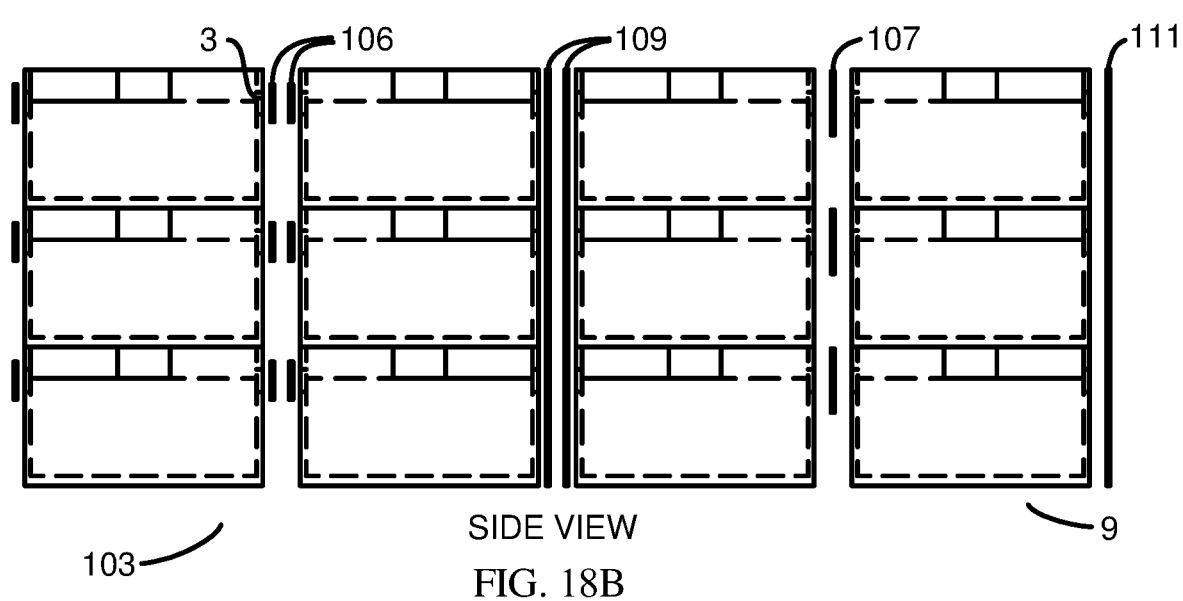
FIG. 18B is a side view of the array of bin assemblies in FIG. 18A.

If a bin 2 has handholds 3 or other types of windows besides the windows 10 through which light is projected, light can be lost through these handholds 3 or other types of windows. FIG. 18A and FIG. 18B show a row 103 of bins 2 from a top view and a side view respectively. Handhold retroreflector 106 may be placed just outside a handhold 3 to reflect light exiting handhold 3 back through handhold 3 in the direction from which it came. If desired, a single double-sided retroreflector 107 may be used to return light exiting from two opposite handholds 3 on adjacent bin assemblies 9. Retroreflectors need not be confined to the immediate vicinities of handholds 3 or other types of windows. Long retroreflective sheets 109 or large retroreflective sheets 111, for example, may extend in one or two dimensions over multiple bin assemblies 9.

Some light can be returned to bin assemblies 9 if retroreflective elements such as handhold retroreflectors 106, double-sided retroreflectors 107, long retroreflective sheets 109, and/or large retroreflective sheets 111 are replaced with highly reflective materials or coatings the reflectance of which can be specular (like a mirror) or diffuse (like a flat white surface) or somewhere in between these extremes.

Figure 19:
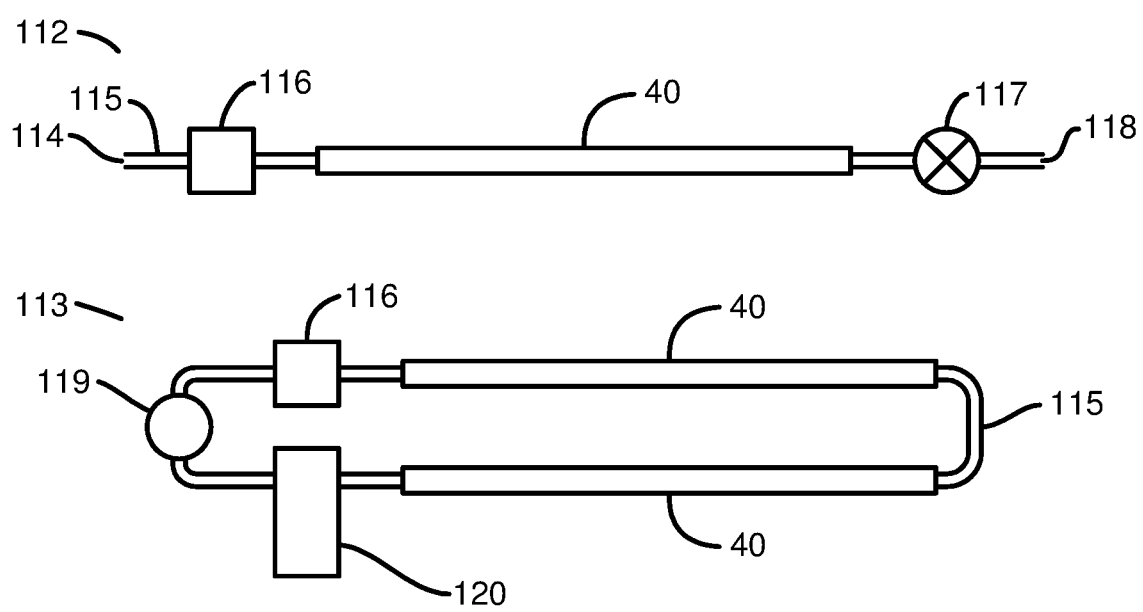
FIG. 19 shows block diagrams of examples of an open-circuit and a closed-circuit cooling system for controlling the temperature of the apparatus.

As was described previously in reference to FIG. 7B, light projector assembly 31A may include all or a portion of a coolant channel 40, which may be configured to contain a coolant 41. FIG. 19 shows block diagrams of an open-circuit cooling system 112 and a closed-circuit cooling system 113 that are examples of cooling systems capable of removing heat from or introducing heat to one or more coolant channels 40. Either cooling system 112 or 113 may include ductwork 115, such as piping, tubing, hoses, channels, and/or ducts, to direct coolant 41 through the system. Either cooling system 112 or 113 also may include one or more filters 116 to, for example, prevent particle buildup within the remaining parts of the system. Either cooling system 112 or 113 may route coolant 41 through one or more coolant channels 40. Open-circuit cooling system 112 may include an inlet 114 to admit coolant 41 and may include an outlet 118 from which coolant 41 may exit. Open-circuit cooling system 112 also may include a valve 117 to, for example, regulate or direct the flow of coolant 41. Closed-circuit cooling system 113 may include a pump 119 to, for example, circulate coolant 41 through the system and may include a heat exchanger or cooler 120 to, for example, extract heat from or introduce heat into coolant 41.

A combination of one or more light projector assemblies 31A and one or more bin assemblies 9 may comprise an irradiation system, of which there may be many variations depending on the numbers and types of projector assemblies 31A and bin assemblies 9 and the choices of various additional features.

It may be noted that the apparatus and methods described, which may be applied for growth of plants, providing living plants are included among the contents 8 of a bin 2, may also be applied to the growth or processing of organisms in general, including, for example, animals or cellular organisms, or may be used for other applications in which contents 8 may be irradiated by electromagnetic radiation. For example, the apparatus and methods described may be applied for irradiating the bin interior 1 of a bin 2 with ultraviolet light for the purpose of sterilizing the bin interior 1 or for the purpose of sterilizing, preserving, or otherwise processing contents 8 that may, for example, include food products, food-handling tools, or items not related to food including, for example, surgical instruments.

Accordingly, while embodiments have been particularly shown and described, many variations may be made therein. Other combinations of features, functions, elements, and/or properties may be used. Such variations, whether they are directed to different combinations or directed to the same combinations, whether different, broader, narrower, or equal in scope, are also included.

The remainder of this section describes additional aspects and features of a light projector assembly, a bin assembly, a method for irradiating the contents of a bin with light, and an overall irradiation system employing these elements, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference, in any suitable manner. Some of the paragraphs below expressly refer to and further limit other paragraphs, providing without limitation examples of some of the suitable combinations.

A1. A light projector assembly for irradiating a bin interior of a bin assembly when the bin assembly is positioned in a bin position, the bin assembly having a plurality of walls extending around the bin interior and bounded on the top by a ceiling, the bin interior including a plant-growing zone proximate a bottom of the bin assembly, the plurality of walls including a window assembly of one or more light-transmissive windows distributed around the plurality of walls above the plant-growing zone with at least a first wall of the plurality of walls including a first window of the one or more windows, the light projector assembly comprising:

a light projector configured to be supported outside of the bin position and proximate to and spaced at least a first predetermined distance from the first window when the bin assembly is in the bin position, the light projector configured to project light upwardly through at least a first irradiation portal corresponding to the first window of the bin in the bin position and toward the ceiling when the bin assembly is in the bin position; and a support structure supporting the light projector, the support structure being spaced from a vertical extension of the bin position.

A2. The light projector assembly of paragraph A1, wherein the light projector is configured to project light predominantly through the at least the first irradiation portal.

A3. The light projector assembly of paragraph A1, wherein the light projector includes a light source and a reflector, the reflector redirecting through the at least the first irradiation portal light that is emitted by the light source in a direction away from the at least the first irradiation portal.

A4. The light projector assembly of paragraph A3, wherein the light source directs light predominantly at a combination of the at least the first irradiation portal and the reflector.

A5. The light projector assembly of paragraph A4, wherein the light source directs light predominantly at the reflector.

A6. The light projector assembly of paragraph A3, wherein the light source directs light above a source plane aligned with a lower region of the at least the first irradiation portal.

A7. The light projector assembly of paragraph A6, wherein the source plane is also aligned with a distal edge of the ceiling lower surface when the bin assembly is in the bin position.

A8. The light projector assembly of paragraph A6, wherein the light source is spaced horizontally from the bin position and the reflector extends above the light source horizontally closer to the bin position than the light source.

A9. The light projector assembly of paragraph A8, wherein the light projector further includes a retroreflector disposed along the source plane between the light source and the bin position, the retroreflector facing the reflector.

A10. The light projector assembly of paragraph A8, wherein a top of the reflector is below a top of the at least the first irradiation portal, and the light projector further includes a retroreflector extending upwardly from the reflector and facing the at least the first irradiation portal.

A11. The light projector assembly of paragraph A3, wherein the support structure conducts heat generated by the light source away from the light source.

A12. The light projector assembly of paragraph A11, wherein the light projector assembly includes a fluid-conducting channel attached to the support structure for transporting heat conducted by the support structure away from the light source.

A13. The light projector assembly of paragraph A1, wherein the support structure extends along a plurality of horizontally adjacent bin positions, and the light projector assembly further comprises a plurality of the light projectors positioned in a row, with one of the light projectors associated with each of the plurality of bin positions.

A14. The light projector assembly of paragraph A1, wherein the support structure extends between spaced-apart bin positions, and the light projector assembly further comprises a plurality of the light projectors, with one of the light projectors associated with each of the plurality of bin positions and positioned to direct light through the irradiation portal associated with the respective bin position.

A15. The light projector assembly of paragraph A1, wherein the light projector is configured to project all of the light that is projected from the light projector directly through the irradiation portal in an upward direction.

A16. The light projector assembly of paragraph A1, wherein the light projector is configured to project at least sixty percent of the light emitted from the source through the at least the first irradiation portal.

A17. The light projector assembly of paragraph A1, wherein the light projector is configured to project light through the at least the first irradiation portal with light impinging the ceiling being distributed with less than plus or minus twenty percent variation in intensity over 80 percent of the ceiling's area.

B1. A bin assembly for supporting plants or other organisms during growth, the bin assembly comprising:

a first bin having a bottom for supporting the growing plants or other organisms and a plurality of walls extending upwardly from the bottom, the walls and bottom defining a bin interior including a plant-growing zone in a lower portion of the bin interior proximate the bottom, the plurality of walls including a window assembly of one or more windows distributed around the plurality of walls above the plant-growing zone; and a ceiling configured to be supported over the bin interior, the ceiling having a light-reflective lower surface facing the bin interior, the window assembly being configured to expose at least a portion of the ceiling lower surface from externally of the bin.

B2. The bin assembly of paragraph B1, wherein the bin has a width and a length, the plurality of walls include a first wall having a width extending the width or the length of the bin, and the first wall includes a window near to a top of the first wall proximate to the ceiling and a width corresponding to the width of the first wall.

B3. The bin assembly of paragraph B1, wherein the bin has a width and a length, the plurality of walls include first and second walls positioned opposite each other and having respective widths extending the width or the length of the bin, and the first and second walls have respective at least first and at least second windows near to a top of the respective first and second walls proximate to the ceiling.

B4. The bin assembly of paragraph B3, wherein the widths of the respective at least first and at least second windows are less than the widths of the respective first and second walls.

B5. The bin assembly of paragraph B4, wherein the at least first and at least second windows expose different areas of the ceiling lower surface when viewed from outside of the at least first and at least second windows in directions normal to areas defined by the at least first and at least second windows.

B6. The bin assembly of paragraph B1, wherein the window assembly exposes at least eighty percent of the ceiling lower surface from externally of the bin.

B7. The bin assembly of paragraph B1, wherein the window assembly exposes at least ninety-five percent of the ceiling lower surface from externally of the bin.

B8. The bin assembly of paragraph B1, wherein the one or more windows of the window assembly are unobstructed openings in the walls.

B9. The bin assembly of paragraph B1, wherein the one or more windows of the window assembly are at the tops of the respective wall or walls.

B10. The bin assembly of paragraph B9, wherein the one or more windows of the window assembly are unobstructed openings that extend to the ceiling.

B11. The bin assembly of paragraph B1, wherein the bin has four sides formed by the plurality of walls, and the one or more windows of the window assembly are all on one of the sides of the bin.

B12. The bin assembly of paragraph B1, wherein the plurality of walls include first and second walls positioned opposite each other, and the one or more windows are on only the first and second walls, and the one or more windows includes at least a first window on the first wall and a second window on the second wall.

B13. The bin assembly of paragraph B1, wherein the bin assembly includes a second bin supported on the first bin, the second bin having a second bottom that is the ceiling, with a second bottom having a bottom surface forming the ceiling lower surface.

C1. A method of irradiating plants or other organisms growing in bins comprising:
positioning a bin having a plurality of walls and a bottom defining a bin interior including a plant-growing zone proximate to the bin bottom, the plant-growing zone containing a plant-growing medium, with a first bin wall facing a first light projector;
supporting a ceiling over the bin; and
directing light from the first light projector through a window of the first bin wall, the window being above the plant-growing zone.

C2. The method of paragraph C1, wherein directing light from the first light projector through the window includes directing light from the first light projector upwardly through the window toward the ceiling.

C3. The method of paragraph C2, further comprising, reflecting from the ceiling light directed to the ceiling from the first light projector downwardly toward the plant-growing zone.

C4. The method of paragraph C3, wherein directing light from the first light projector upwardly through the window includes directing light from the first light projector predominantly upwardly through the window toward the ceiling.

C5. The method of paragraph C3, wherein directing light from the first light projector upwardly through the window includes directing light from the first light projector onto at least a portion of the ceiling with less than plus or minus twenty percent variation in the intensity of light from the first light projector across the at least a portion of the ceiling.

C6. The method of paragraph C5, wherein directing light from the first light projector upwardly through the window includes directing light from the first light projector onto at least the portion of the ceiling with less than plus or minus ten percent variation in the intensity of light from the first light projector across the at least a first portion of the ceiling.

C7. The method of paragraph C3, wherein directing light from the first light projector through the window of the first bin wall includes directing light from the first light projector through the window of the first bin wall, the window being at a top of the first bin wall.

C8. The method of paragraph C7, wherein directing light from the first light projector through the window of the first bin wall includes directing light from the first light projector through the window of the first bin wall along at least eighty percent of the ceiling.

C9. The method of paragraph C8, wherein positioning the bin with the first bin wall facing the first light projector includes positioning the bin with a second bin wall, opposite the first bin wall, facing a second light projector, and further includes directing light from the second light projector upwardly through a window of the second bin wall toward the ceiling.

C10. The method of paragraph C9, wherein directing light from the first light projector includes directing light from the first light projector onto a first portion of the ceiling and directing light from the second light projector includes directing light from the second light projector onto a second portion of the ceiling different than the first portion of the ceiling.

C11. The method of paragraph C10, wherein directing light from the first and second light projectors includes directing light from the first and second light projectors onto the first and second portions of the ceiling that comprise in combination at least 80% of the ceiling.

D1. An irradiation system comprising:
a bin having a bottom for supporting growing organisms and a plurality of walls extending upwardly from the bottom, the walls and bottom defining a bin interior including an organism-growing zone in a lower portion of the bin interior proximate the bottom, the plurality of walls including a window assembly of one or more windows distributed around the plurality of walls above the organism-growing zone with at least a first wall of the plurality of walls including a first window of the one or more windows;
a ceiling configured to be supported over the bin interior, the ceiling having a light-reflective lower surface facing the bin interior, the window assembly being configured to expose at least a portion of the ceiling lower surface from externally of the bin;
a light projector for irradiating a bin interior of a bin when the bin is positioned in a bin position, the light projector configured to be supported outside of the bin position and proximate to and spaced at least a first predetermined distance from the first window when the bin is in the bin position, the light projector configured to project light upwardly through at least a first irradiation portal corresponding to the first window of the bin in the bin position and toward the ceiling when the bin is in the bin position; and
a support structure supporting the light projector, the support structure being spaced from a vertical extension of the bin position.

INDUSTRIAL APPLICABILITY

The methods and apparatus described in the present disclosure are applicable to agricultural, horticultural, grocery, food service, medical, sanitation, warehousing and other industries in which there are applications for exposure of the interiors or contents of containers to light or other electromagnetic radiation.

What is claimed is:

1. A light projector assembly for irradiating a bin interior of a bin assembly when the bin assembly is positioned in a bin position, the bin assembly having a plurality of walls extending around the bin interior and bounded on the top by a ceiling, the bin interior including a plant-growing zone proximate a bottom of the bin assembly, the plurality of walls including a window assembly of one or more light-transmissive windows distributed around the plurality of walls above the plant-growing zone with at least a first wall of the plurality of walls including a first window of the one or more windows, the light projector assembly comprising:
    a light projector configured to be supported outside of the bin position and proximate to and spaced at least a first predetermined distance from the first window when the bin assembly is in the bin position, the light projector configured to project light upwardly through at least a first irradiation portal corresponding to the first window of the bin in the bin position and toward the ceiling when the bin assembly is in the bin position, the light projector including a light source and a reflector, the reflector redirecting through the at least the first irradiation portal light that is emitted by the light source in a direction away from the at least the first irradiation portal, the light source directing light above a source plane aligned with a lower region of the at least the first irradiation portal; and
    a support structure supporting the light projector, the support structure being spaced from a vertical extension of the bin position.

2. The light projector assembly of claim 1, wherein the source plane is also aligned with a distal edge of the ceiling lower surface when the bin assembly is in the bin position.

3. The light projector assembly of claim 1, wherein the light source is spaced horizontally from the bin position and the reflector extends above the light source horizontally closer to the bin position than the light source.

4. The light projector assembly of claim 3, wherein the light projector further includes a retroreflector disposed along the source plane between the light source and the bin position, the retroreflector facing the reflector.

5. The light projector assembly of claim 3, wherein a top of the reflector is below a top of the at least the first irradiation portal, and the light projector further includes a retroreflector extending upwardly from the reflector and facing the at least the first irradiation portal.

6. The light projector assembly of claim 1, wherein the support structure conducts heat generated by the light source away from the light source.

7. The light projector assembly of claim 6, wherein the light projector assembly includes a fluid-conducting channel attached to the support structure for transporting heat conducted by the support structure away from the light source.

8. The light projector assembly of claim 1, the light projector including a light source positioned below a top of the first window when the bin assembly is in the bin position, the light source generating emitted light, the light projector configured to project at least a portion of the emitted light upwardly through at least a first irradiation portal corresponding to the first window of the bin in the bin position and toward the ceiling when the bin assembly is in the bin position.

9. The light projector assembly of claim 8, wherein the light projector is spaced from a vertical extension of the bin position.

10. The light projector assembly of claim 8, wherein the light projector is configured to project light predominantly through the at least the first irradiation portal.

11. The light projector assembly of claim 8, wherein the light projector includes a light source and a reflector, the reflector redirecting through the at least the first irradiation portal light that is emitted by the light source in a direction away from the at least the first irradiation portal.

12. The light projector assembly of claim 11, wherein the light source directs light predominantly at a combination of the at least the first irradiation portal and the reflector.

13. The light projector assembly of claim 12, wherein the light source directs light predominantly at the reflector.

14. The light projector assembly of claim 8, wherein the support structure extends along a plurality of horizontally adjacent bin positions, and the light projector assembly further comprises a plurality of the light projectors positioned in a row, with one of the light projectors associated with each of the plurality of bin positions.

15. The light projector assembly of claim 8, wherein the support structure extends between spaced-apart bin positions, and the light projector assembly further comprises a plurality of the light projectors, with one of the light projectors associated with each of the plurality of bin positions and positioned to direct light through the irradiation portal associated with the respective bin position.

16. The light projector assembly of claim 8, wherein the light projector is configured to project all of the light that is projected from the light projector directly through the irradiation portal in an upward direction.

17. The light projector assembly of claim 8, wherein the light projector is configured to project at least sixty percent of the light emitted from the source through the at least the first irradiation portal.

18. The light projector assembly of claim 8, wherein the light projector is configured to project light through the at least the first irradiation portal with light impinging the ceiling being distributed with less than plus or minus twenty percent variation in intensity over 80 percent of the ceiling's area.

19. A bin assembly for supporting plants or other organisms during growth, the bin assembly comprising:
    a first bin having a bottom for supporting the growing plants or other organisms and a plurality of walls extending upwardly from the bottom, the walls and bottom defining a bin interior including a plant-growing zone in a lower portion of the bin interior proximate the bottom, the plurality of walls including a window assembly of one or more windows distributed around the plurality of walls above the plant-growing zone, the first bin having a width and a length, the plurality of walls including first and second walls positioned opposite each other and having respective widths extending the width or the length of the first bin, the first and second walls having respectively at least first and at least second windows near to a top of the respective first and second walls proximate to the ceiling, the widths of the respective at least first and at least second windows being less than the widths of the respective first and second walls;

a first ceiling configured to be supported over the first bin's interior, the first ceiling having a light-reflective lower surface facing the first bin's interior, the at least first window exposing a first area of the first ceiling lower surface and the at least second window exposing a second area of the first ceiling lower surface when viewed from outside of the at least first and at least second windows in directions normal to areas defined by the at least first and at least second windows;

a second bin and a second ceiling configured and positioned as mirror images, with respect to a vertical first mirror image plane, of the first bin and first ceiling respectively, the second bin and second ceiling being positioned adjacent to the first bin and first ceiling;

the at least first and at least second windows being configured to allow a light projector of length less than the sum of the widths of the first and second walls to project a first light pattern on the first ceiling and a second light pattern on the second ceiling such that a mirror image of the second light pattern with respect to a second mirror image plane perpendicular to the first mirror image plane, when properly translated to be superimposed on the first light pattern on the first ceiling would result in a combined light pattern on the first ceiling having better than plus or minus fifty percent uniformity over at least 80 percent of the first ceiling's area.

20. The bin assembly of claim 19, wherein the one or more windows of the window assembly are unobstructed openings in the walls.

21. The bin assembly of claim 19, wherein the one or more windows of the window assembly are at the tops of the respective wall or walls.

22. The bin assembly of claim 21, wherein the one or more windows of the window assembly are unobstructed openings that extend to the ceiling.

23. The bin assembly of claim 19, wherein the bin assembly includes a third bin supported on the first bin, the third bin having a second bottom that is the ceiling, with the second bottom having a bottom surface forming the ceiling lower surface.

24. A method of irradiating plants or other organisms growing in bins comprising:
    positioning a bin having a plurality of walls and a bottom defining a bin interior including a plant-growing zone proximate to the bin bottom, the plant-growing zone containing a plant-growing medium, with a first bin wall facing a first light projector, the light projector containing a light source;
    supporting a ceiling over the bin; and
    directing light predominantly upwardly from the first light projector through a window of the first bin wall and toward the ceiling, the window being above the plant-growing zone, the light source being positioned below a top of the window, and the light source directing light above a source plane aligned with a lower region of the window.

25. The method of claim 24, further comprising, reflecting from the ceiling light directed to the ceiling from the first light projector downwardly toward the plant-growing zone.

26. The method of claim 25, wherein directing light from the first light projector upwardly through the window includes directing light from the first light projector onto at least a portion of the ceiling with less than plus or minus twenty percent variation in the intensity of light from the first light projector across the at least a portion of the ceiling.

27. The method of claim 26, wherein directing light from the first light projector upwardly through the window includes directing light from the first light projector onto at least the portion of the ceiling with less than plus or minus ten percent variation in the intensity of light from the first light projector across the at least a first portion of the ceiling.

28. The method of claim 25, wherein directing light from the first light projector through the window of the first bin wall includes directing light from the first light projector through the window of the first bin wall, the window being at a top of the first bin wall.

29. The method of claim 28, wherein directing light from the first light projector through the window of the first bin wall includes directing light from the first light projector through the window of the first bin wall along at least eighty percent of the ceiling.

30. The method of claim 29, wherein positioning the bin with the first bin wall facing the first light projector includes positioning the bin with a second bin wall, opposite the first bin wall, facing a second light projector, and further includes directing light from the second light projector upwardly through a window of the second bin wall toward the ceiling.

31. The method of claim 30, wherein directing light from the first light projector includes directing light from the first light projector onto a first portion of the ceiling and directing light from the second light projector includes directing light from the second light projector onto a second portion of the ceiling different than the first portion of the ceiling.

32. The method of claim 31, wherein directing light from the first and second light projectors includes directing light from the first and second light projectors onto the first and second portions of the ceiling that comprise in combination at least 80% of the ceiling.

33. An irradiation system comprising:
    a bin having a bottom for supporting growing organisms and a plurality of walls extending upwardly from the bottom, the walls and bottom defining a bin interior including an organism-growing zone in a lower portion of the bin interior proximate the bottom, the plurality of walls including a window assembly of one or more windows distributed around the plurality of walls above the organism-growing zone with at least a first wall of the plurality of walls including a first window of the one or more windows;
    a ceiling configured to be supported over the bin interior, the ceiling having a light-reflective lower surface facing the bin interior, the window assembly being configured to expose at least a portion of the ceiling lower surface from externally of the bin;
    a light projector for irradiating a bin interior of a bin when the bin is positioned in a bin position, the light projector configured to be supported outside of the bin position and proximate to and spaced at least a first predetermined distance from the first window when the bin is in the bin position, the light projector including a light source positioned below a top of the first window when the bin is in the bin position, the light source generating emitted light, the light projector configured to project light upwardly through at least a first irradiation portal corresponding to the first window of the bin in the bin position and toward the ceiling when the bin is in the bin position, the light source directing light above a source plane aligned with a lower region of the first window; and a support structure supporting the light projector, the support structure being spaced from a vertical extension of the bin position.

* * * * *